US010761911B2

(12) United States Patent
Gupta et al.

(10) Patent No.: US 10,761,911 B2
(45) Date of Patent: Sep. 1, 2020

(54) ASYNCHRONOUS APPLICATION INTERACTIONS IN DISTRIBUTED SYSTEMS

(71) Applicant: Nutanix, Inc., San Jose, CA (US)

(72) Inventors: Vinod Gupta, Fremont, CA (US); Abhijit S. Khinvasara, Los Altos, CA (US)

(73) Assignee: Nutanix, Inc., San Jose, CA (US)

( * ) Notice: Subject to any disclaimer, the term of this patent is extended or adjusted under 35 U.S.C. 154(b) by 0 days.

(21) Appl. No.: 15/431,404

(22) Filed: Feb. 13, 2017

(65) Prior Publication Data

US 2020/0026587 A1   Jan. 23, 2020

(51) Int. Cl.
  G06F 9/54   (2006.01)
  G06F 8/60   (2018.01)

(52) U.S. Cl.
  CPC ............... *G06F 9/546* (2013.01); *G06F 8/60* (2013.01)

(58) Field of Classification Search
  CPC .................................. G06F 9/546; G06F 8/60
  See application file for complete search history.

(56) References Cited

U.S. PATENT DOCUMENTS

| | | |
|---|---|---|
| 8,381,231 B2 | 2/2013 | Kacin et al. |
| 8,549,518 B1 | 10/2013 | Aron et al. |
| 8,601,473 B1 | 12/2013 | Aron et al. |
| 8,649,771 B1 | 2/2014 | Faaborg et al. |
| 8,850,130 B1 | 9/2014 | Aron et al. |
| 9,223,966 B1 | 12/2015 | Satish et al. |
| 9,342,784 B1 | 5/2016 | Rajagopal et al. |
| 9,772,866 B1 | 9/2017 | Aron et al. |
| 9,800,517 B1 | 10/2017 | Anderson |
| 2005/0091213 A1 | 4/2005 | Schutz et al. |
| 2006/0059230 A1* | 3/2006 | Dykas .................... G06Q 10/10 709/206 |

(Continued)

OTHER PUBLICATIONS

Non-Final Office Action dated May 23, 2018 for related U.S. Appl. No. 15/173,577.

(Continued)

*Primary Examiner* — Charles E Anya
(74) *Attorney, Agent, or Firm* — Vista IP Law Group, LLP

(57) ABSTRACT

Systems and methods for managing communication between applications (e.g., apps) in a host computing environment. Apps are published to a globally-accessible site. Upon download of an app to a host computing environment, apps can register themselves with a communication gateway as being discoverable and permissive to inter-app communications. Message queues are created to facilitate asynchronous communications between apps. After registration, any of the apps can send and receive messages using the communication gateway. The messages can be directed to any other app that is registered with the communication gateway. Using the message queues, the communication gateway facilitates asynchronous app interactions such that any app can communicate with any other discoverable and permissive app. Aspects of operation, discoverability and other attributes can be codified in an application manifest that is processed by the communication gateway. Discoverability, source of origination, payload contents, permissions and other attributes are carried in the application manifest.

22 Claims, 13 Drawing Sheets

(56) References Cited

U.S. PATENT DOCUMENTS

| | | |
|---|---|---|
| 2007/0083512 A1 | 4/2007 | Pepin et al. |
| 2007/0198656 A1 | 8/2007 | Mazzaferri et al. |
| 2007/0260831 A1 | 11/2007 | Michael et al. |
| 2009/0217296 A1 | 8/2009 | Gebhart et al. |
| 2009/0300414 A1 | 12/2009 | Huang et al. |
| 2009/0307435 A1 | 12/2009 | Nevarez et al. |
| 2011/0078790 A1 | 3/2011 | Fazunenko et al. |
| 2011/0185292 A1 | 7/2011 | Chawla et al. |
| 2012/0005673 A1 | 1/2012 | Cervantes et al. |
| 2012/0110574 A1 | 5/2012 | Kumar |
| 2012/0117562 A1 | 5/2012 | Jess et al. |
| 2012/0151568 A1 | 6/2012 | Pieczul et al. |
| 2012/0167079 A1 | 6/2012 | Banerjee et al. |
| 2012/0191908 A1 | 7/2012 | North et al. |
| 2013/0185715 A1 | 7/2013 | Dunning et al. |
| 2013/0198828 A1 | 8/2013 | Pendergrass et al. |
| 2013/0275886 A1 | 10/2013 | Haswell et al. |
| 2013/0290399 A1 | 10/2013 | Gordon |
| 2014/0020043 A1* | 1/2014 | Anand .............. G06F 9/544 726/1 |
| 2014/0052864 A1 | 2/2014 | Van Der et al. |
| 2014/0075426 A1 | 3/2014 | West et al. |
| 2014/0082634 A1* | 3/2014 | Hickford ............ G09B 29/00 719/313 |
| 2014/0201317 A1* | 7/2014 | Nerieri ............... H04L 67/10 709/217 |
| 2014/0222930 A1 | 8/2014 | Gangadharan et al. |
| 2014/0297713 A1 | 10/2014 | Meigen et al. |
| 2014/0304700 A1* | 10/2014 | Kim .................... G06F 8/65 717/173 |
| 2014/0359619 A1 | 12/2014 | Park et al. |
| 2015/0089577 A1* | 3/2015 | Beckman ........... H04L 63/105 726/1 |
| 2015/0121375 A1 | 4/2015 | Balasubramanyam et al. |
| 2015/0135338 A1 | 5/2015 | Moskal |
| 2015/0143091 A1* | 5/2015 | Brace ............... G06F 9/44505 713/1 |
| 2015/0261951 A1* | 9/2015 | Abuelsaad .......... G06F 21/554 726/22 |
| 2015/0271256 A1* | 9/2015 | Pathak ............... H04L 47/6225 709/223 |
| 2015/0331722 A1* | 11/2015 | Magro ................ G06F 9/45533 718/1 |
| 2016/0105392 A1 | 4/2016 | Thakkar et al. |
| 2016/0147558 A1 | 5/2016 | Gaponenko et al. |
| 2016/0301680 A1* | 10/2016 | Main .................. H04W 12/08 |
| 2016/0342453 A1 | 11/2016 | Khan et al. |
| 2016/0359955 A1 | 12/2016 | Gill et al. |
| 2016/0378518 A1 | 12/2016 | Antony et al. |
| 2016/0381080 A1 | 12/2016 | Reddem et al. |
| 2017/0046134 A1 | 2/2017 | Straub |
| 2017/0102925 A1 | 4/2017 | Ali et al. |
| 2017/0177171 A1 | 6/2017 | Won |
| 2017/0255890 A1 | 9/2017 | Palavalli et al. |
| 2017/0272472 A1 | 9/2017 | Adhar |

OTHER PUBLICATIONS

Wikipedia. "Remote direct memory access". Mar. 20, 2015. 2 pages.
International Search Report and Written Opinion dated Sep. 8, 2016 for corresponding PCT Patent Application No. PCT/US16/35929, 10 pages.
Non-Final Office Action dated Jan. 31, 2018 for related U.S. Appl. No. 15/173,577.
Wikipedia. "LXC". Apr. 18, 2017. 3 pages.
Wikipedia. "HTML element". Apr. 10, 2017. 7 pages.
U.S. Appl. No. 15/665,079, filed Jul. 31, 2017, 76 pages.
European Search Report dated May 9, 2018 for EP Application No. 16804612.6, 7 pages.
Merkel, D. "Docker: Lightweight Linux Containers for Consistent Development and Deployment". Mar. 2014. 16 pages.
Non-Final Office Action dated Jan. 19, 2018 for related U.S. Appl. No. 15/360,077.
Final Office Action dated Jun. 20, 2018 for related U.S. Appl. No. 15/360,077.
Non-Final Office Action dated Jul. 19, 2018 for related U.S. Appl. No. 15/665,079.
Final Office Action dated Sep. 24, 2018 for related U.S. Appl. No. 15/173,577, 16 pages.
Poitras, Steven. "The Nutanix Bible" (Oct. 15, 2013), from http://stevenpoitras.com/the-nutanix-bible/ (Publication date based on indicated capture date by Archive.org; first publication date unknown).
Poitras, Steven. "The Nutanix Bible" (Jan. 11, 2014), from http://stevenpoitras.com/the-nutanix-bible/ (Publication date based on indicated capture date by Archive.org; first publication date unknown).
Poitras, Steven. "The Nutanix Bible" (Jun. 20, 2014), from http://stevenpoitras.com/the-nutanix-bible/ (Publication date based on indicated capture date by Archive.org; first publication date unknown).
Poitras, Steven. "The Nutanix Bible" (Jan. 7, 2015), from http://stevenpoitras.com/the-nutanix-bible/ (Publication date based on indicated capture date by Archive.org; first publication date unknown).
Poitras, Steven. "The Nutanix Bible" (Jun. 9, 2015), from http://stevenpoitras.com/the-nutanix-bible/ (Publication date based on indicated capture date by Archive.org; first publication date unknown).
Poitras, Steven. "The Nutanix Bible" (Sep. 4, 2015), from https://nutanixbible.com/.
Poitras, Steven. "The Nutanix Bible" (Jan. 12, 2016), from https://nutanixbible.com/.
Poitras, Steven. "The Nutanix Bible" (Jun. 9, 2016), from https://nutanixbible.com/.
Poitras, Steven. "The Nutanix Bible" (Jan. 3, 2017), from https://nutanixbible.com/.
Poitras, Steven. "The Nutanix Bible" (Jun. 8, 2017), from https://nutanixbible.com/.
Poitras, Steven. "The Nutanix Bible" (Jan. 3, 2018), from https://nutanixbible.com/.
Poitras, Steven. "The Nutanix Bible" (Jun. 25, 2018), from https://nutanixbible.com/.
Poitras, Steven. "The Nutanix Bible" (Jan. 8, 2019), from https://nutanixbible.com/.
Non-Final Office Action dated Jan. 9, 2019 for related U.S. Appl. No. 15/173,577, 10 pages.
Final Office Action dated Jan. 23, 2019 for related U.S. Appl. No. 15/665,079, 16 pages.
Pahl, Claus. "Containers and Clusters for Edge Cloud Architectures—a Technology Review". Oct. 26, 2015. 8 pages.
Ratter et al. "Using Linux Containers in Telecom Applications". Mar. 3, 2016. 8 pages.
Bernstein, David. "Containers and Cloud: From LXC to Docker to Kubernetes". IEEE Cloud Computing. Sep. 2014. 4 pages.
Gerlach et al. "Skyport—Container-Based Execution Environment Management for Multi-cloud Scientific Workflows". Nov. 2014. 9 pages.
Burns et al. "Design patterns for container-based distributed systems". HotCloud'16 Proceedings of the 8th USENIX Conference on Hot Topics in Cloud Computing. Jun. 12, 2016. 6 pages.
Marmol et al. "Networking in Containers and Container Clusters". Proceedings of netdev 0.1. Feb. 17, 2015. 4 pages.
Amautov et al. "SCONE: Secure Linux Containers with Intel SGX". Nov. 4, 2016. 17 pages.
Burns et al. "Borg, Omega, and Kubernetes". ACM Queue, vol. 14 (2016), pp. 70-93.
Singh, Satnam. "Cluster-level Logging of Containers with Containers". ACM Queue, vol. 14, issue 3, Jun. 28, 2016. 24 pages.
Non-Final Office Action dated Mar. 8, 2019 for related U.S. Appl. No. 15/674,923, 10 pages.
Non-Final Office Action dated Oct. 25, 2018 for related U.S. Appl. No. 15/360,077, 20 pages.
Non-Final Office Action dated Mar. 29, 2019 for related U.S. Appl. No. 15/620,486, 20 pages.
Non-Final Office Action dated Oct. 23, 2019 for related U.S. Appl. No. 15/173,577.
Cano, I. et al., "Curator: Self-Managing Storage for Enterprise Clusters", 14th USENIX Symposium on Networked Systems Design and Implementation, NSDI '17, (Mar. 27, 2017).

(56) References Cited

OTHER PUBLICATIONS

Notice of Allowance dated Jan. 8, 2020 for related U.S. Appl. No. 15/360,077.
Srivastav, P. "What is Docker?" (Jan. 10, 2016) date identified by Google, from https://docker-curriculum.com/#give-feedback.
Evans, C. "Working With Containers #1: Getting Started with Docker" (Feb. 1, 2016) from https://blog.architecting.it/working-with-containers-1-getting-started-with-docker/.
Baldwin, M. "Configure A Docker Container to Automatically Pull From GitHub Using Oauth" (Feb. 19, 2015), from https://devops.ionos.com/tutorials/configure-a-docker-container-to-automatically-pull-from-github-using-oauth/.
Hall, S. "Supergiant Builds on Kubernetes to Manage Multitenancy for Distributed Applications" (Sep. 21, 2016), from https://thenewstack.io/supergiant-builds-kubernetes-manage-multi-tenancy-distributed-applications/.
Hom, C. "Kubernetes Cluster Federation: Efficiently deploy and manage applications across the globe" (Jul. 21, 2016), from https://coreos.com/blog/kubernetes-cluster-federation.html.
Sanchez, G. "Drive a full lifecycle with Jenkins + Kubernetes" (Oct. 20, 2016), from https://elasticbox.com/blog/.
StackPointCloud: "Node Autoscaling, Docker to Kubernetes Onboarding Tools & Production Fabric8 for Developers" (Oct. 27, 2016), from https://blog.stackpoint.io/node-autoscaling-docker-to-kubernetes-onboarding-tools-production-fabric8-for-developers-8e77a4a237b2.
Strachan, J. "The easiest way to get started with fabric8 on the public cloud is now StackPointCloud!" (Oct. 31, 2016), from https://blog.fabric8.io/the-easiest-way-to-get-started-with-fabric8-on-the-public-cloud-is-now-stackpointcloud-2f2083d91bf4.
Tost et al. "Build and extend Docker container images with middleware functions" (Aug. 22, 2016), from https://developer.ibm.com/tutorials/mw-1608-tost-trs/.
Kumar et al. "Creating and Managing Docker VM Extensions in Azure" (Oct. 15, 2015), from https://www.red-gate.com/simple-talk/cloud/platform-as-a-service/creating-and-managing-docker-vm-extensions-in-azure/.
"Working with Docker" (Apr. 4, 2019), from https://code.visualstudio.com/docs/azure/docker.
Sullivan, A. "NetApp Persistent Storage in Kubernetes: Using ONTAP and NFS" (May 11, 2016), from https://netapp.io/2016/05/11/netapp-persistent-storage-kubernetes-using-ontap-nfs/.
Sullivan, A. "Are Docker Containers Right for Your Enterprise Applications?" (Apr. 19, 2016), from https://blog.netapp.com/blogs/are-docker-containers-right-for-your-enterprise-applications/.
Younes R. "Dockerizing a PHP Application" (Mar. 9, 2016), from https://semaphoreci.com/community/tutorials/dockerizing-a-php-application.
Final Office Action dated May 10, 2019 for related U.S. Appl. No. 15/360,077.
Final Office Action dated Jul. 5, 2019 for related U.S. Appl. No. 15/173,577.
Non-Final Office Action dated Aug. 6, 2019 for related U.S. Appl. No. 15/360,077.
Final Office Action dated Sep. 18, 2019 for related U.S. Appl. No. 15/674,923.
Notice of Allowance dated Mar. 9, 2020 for related U.S. Appl. No. 15/173,577.
Notice of Allowability dated Apr. 8, 2020 for related U.S. Appl. No. 15/360,077.

* cited by examiner

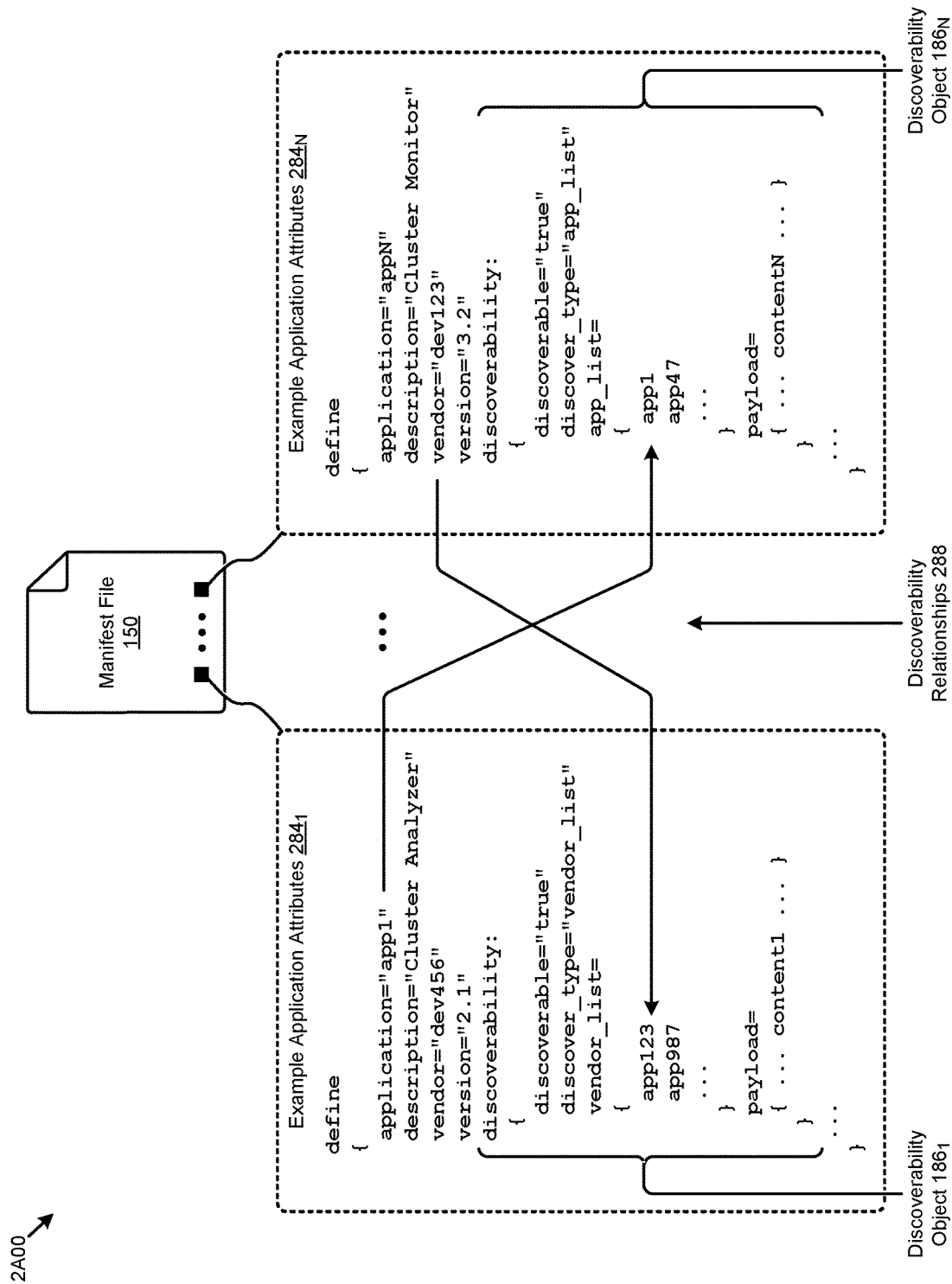

ASYNCHRONOUS APPLICATION INTERACTIONS IN DISTRIBUTED SYSTEMS

FIELD

This disclosure relates to distributed data storage, and more particularly to techniques for facilitating an asynchronous interaction protocol pertaining to installation and use of applications in a distributed virtualization environment.

BACKGROUND

Many modern computing systems include virtual entities, such as virtual machines (VMs), to improve the utilization of computing resources. Such VMs can be characterized as software-based computing "machines" implemented in a virtualization environment that emulates the underlying hardware resources (e.g., CPU, memory, etc.). For example, multiple VMs can operate on one physical machine (e.g., host computer) running a single host operating system, while the VMs might run multiple applications on various respective guest operating systems.

Another virtual entity in modern computing systems is the container, which is implemented using operating system virtualization or container virtualization. The containers implemented in container virtualization environments comprise groups of processes and/or resources (e.g., memory, CPU, disk, etc.) that are isolated from the host computer and other containers. Such containers directly interface with the kernel of the host operating system with, in most cases, no hypervisor layer. As an example, certain applications can be implemented as containerized applications (CAs). The use of VMs, CAs and other virtualized entities in distributed computing systems to improve the utilization of computing resources continues to increase.

The high storage I/O (input/output or IO) demand of VMs and CAs has in turn brought to bear an increase in deployment of distributed storage systems. Distributed storage systems can aggregate various physical storage facilities to create a logical storage pool where data may be efficiently distributed according to various metrics and/or objectives. Modern hyperconverged (e.g., combining networked compute nodes and storage nodes) systems often host autonomous nodes that facilitate incremental and/or linear scaling. Some clusters in a distributed system might scale to hundreds of nodes or more that support several thousands or more autonomous VMs. As such, the topology and/or the storage I/O activity of the distributed system can be highly dynamic. Users (e.g., system administrators) of such large scale, highly dynamic distributed systems desire applications (e.g., management tools) that facilitate managing and/or analyzing the distributed systems that are resilient and/or responsive to changes in the system topology.

Often new functionality pertaining to management and/or analysis of the cluster is desired by the user. For example, a given system administrator for an enterprise might determine that a certain set of metrics are correlated to the performance of the enterprise's distributed compute and storage system implementation, and desires an extension to the system management application that measures and analyzes those identified metrics. In some distributed virtualization environments, applications can be implemented as CAs. Some containerized applications can be configured to implement a particular function or set of functions without reliance on a fully-configured hardware and/or software platform. For example, a containerized application might be defined to perform some simple operation over some given inputs and then produce an output in a predefined format. In such a case, the containerized application can be considered to be lightweight, at least as pertains to not having the "weight", for example, of a hypervisor and/or a guest operating system (e.g., as implemented with VMs).

Containerized applications can provide a certain level of secure isolation from other components in the distributed virtualization system. The foregoing characteristics of these containerized applications can be desirable to users of distributed virtualization systems. For example, one or more resource owners (e.g., data provider, service provider, enterprise, etc.) each implementing a respective large, multi-user (e.g., multi-tenant) cluster in a distributed virtualization system may desire to implement applications using containerized applications to provide efficient distribution across the cluster as well as to provide isolation from user (e.g., other tenant) VMs and/or system control components. In some cases, the resource owners further desire access not only to internally developed applications, but also to publicly available applications from, for example, a third-party developer marketplace.

Unfortunately, legacy techniques for deploying applications from third-party developer marketplaces fail to address deployments into distributed virtualization environments. More specifically, legacy techniques merely support installation of a given application based on certain a priori knowledge of the installation environment. For example, a particular application can be developed for a given operating system and/or platform so as to be able to perform certain predetermined functions (e.g., perform file access based on file extension).

What is needed is a technique or techniques to improve over legacy approaches and/or over other considered approaches. Some of the approaches described in this background section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

The present disclosure provides a detailed description of techniques used in systems, methods, and in computer program products for facilitating an asynchronous interaction protocol for applications in a distributed virtualization environment, which techniques advance the relevant technologies to address technological issues with legacy approaches. More specifically, the present disclosure provides a detailed description of techniques used in systems, methods, and in computer program products for facilitating an asynchronous interaction protocol for applications in a distributed virtualization environment. Certain embodiments are directed to technological solutions for implementing a system and protocol for facilitating asynchronous discoverability and messaging between applications in a distributed virtualization environment.

The disclosed embodiments modify and improve over legacy approaches. In particular, the herein-disclosed techniques provide technical solutions that address the technical problems attendant to enabling discoverability of dynamically deployed applications in a distributed virtualization environment. Such technical solutions relate to improvements in computer functionality. Various applications of the herein-disclosed improvements in computer functionality serve to reduce the demand for computer memory, reduce the demand for computer processing power, reduce network bandwidth use, and reduce the demand for inter-component communication. Some embodiments disclosed herein use techniques to improve the functioning of multiple systems within the disclosed environments, and some embodiments advance peripheral technical fields as well. As one specific example, use of the disclosed techniques and devices within the shown environments as depicted in the figures provide advances in the technical field of deploying and managing applications as well as advances in various technical fields related to computing cluster management.

Further details of aspects, objectives, and advantages of the technological embodiments are described herein and in the drawings and claims.

BRIEF DESCRIPTION OF THE DRAWINGS

The drawings described below are for illustration purposes only. The drawings are not intended to limit the scope of the present disclosure.

FIG. 2A is a diagrammatic representation of data structures for discoverability objects used in systems for facilitating an asynchronous interaction protocol for applications in a distributed virtualization environment, according to an embodiment.

DETAILED DESCRIPTION

Figure 1A:
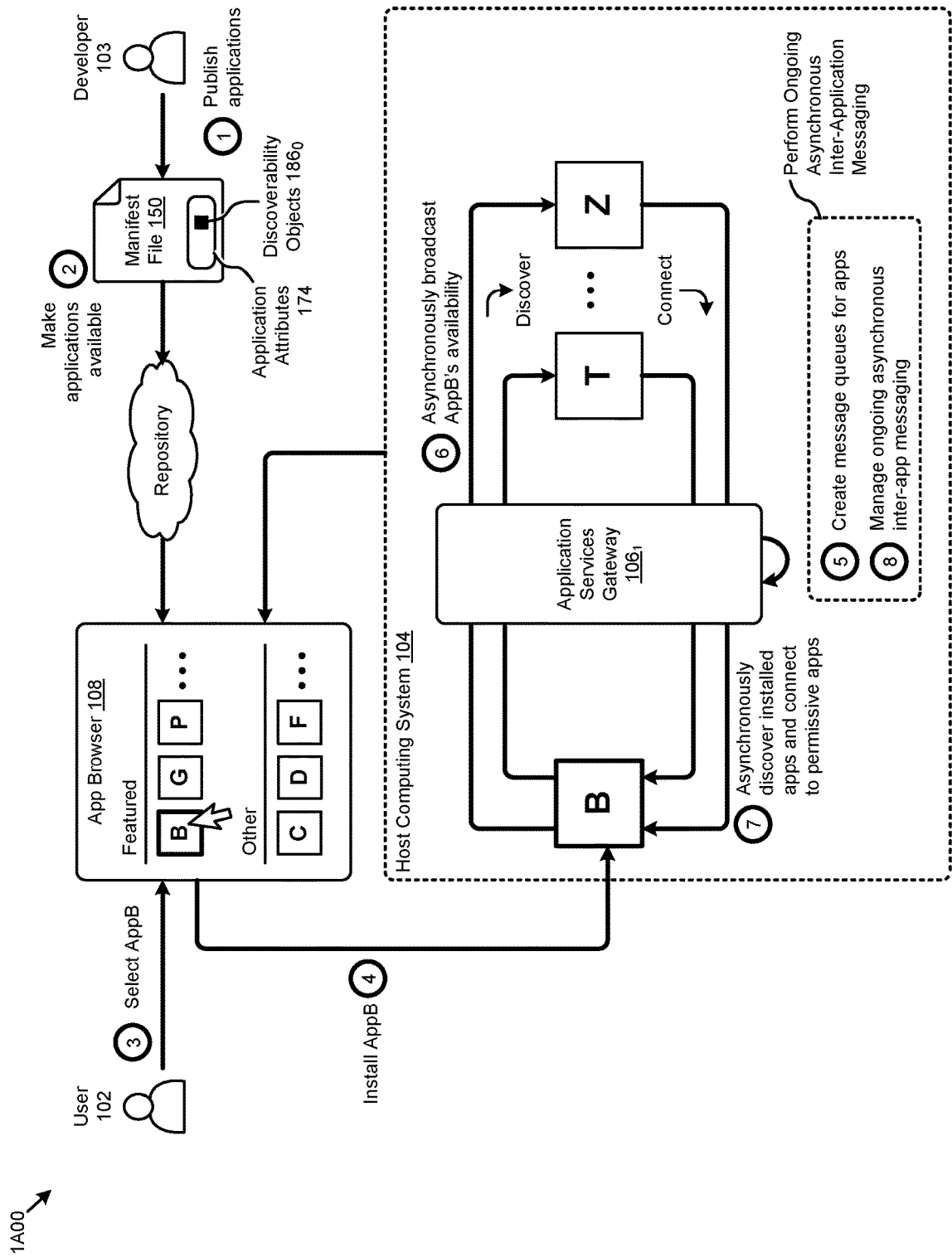
FIG. 1A illustrates a dynamic application discovery technique as implemented in systems that carry out an asynchronous interaction protocol for applications in a distributed virtualization environment, according to an embodiment.

Embodiments in accordance with the present disclosure address the problem of enabling discoverability of dynamically deployed applications in a distributed virtualization environment. Some embodiments are directed to approaches for implementing a system and protocol for facilitating asynchronous discoverability and messaging between applications in a distributed virtualization environment. The accompanying figures and discussions herein present example environments, systems, methods, and computer program products for facilitating an asynchronous interaction protocol for applications in a distributed virtualization environment.

Overview

Disclosed herein are techniques for implementing a system and protocol for facilitating asynchronous discoverability and messaging between applications in a host computing environment such as a clustered computing environment. In certain embodiments, each application installed in the environment has a respective entry in a manifest file accessible by an application services gateway. At least a portion of the entry can serve to designate an intent of an application to interact with other installed applications and to specify a discoverability list of applications identified for interaction. At a certain moment in time (e.g., at installation or first invocation, etc.), the application services gateway can use the manifest file entries to notify each installed application of the other applications from its discoverability list. The application services gateway can create messaging data structures (e.g., message queues) for each installed application to facilitate asynchronous interactions with one another. In certain embodiments, such interactions can pertain to availability notifications or inter-application messages. In certain embodiments, the entries in the manifest file can also describe a payload that can be issued from a given application to one or more of the other applications on its discoverability list.

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

Descriptions of Example Embodiments

FIG. 1A illustrates a dynamic application discovery technique 1A00 as implemented in systems that carry out an asynchronous interaction protocol for applications in a distributed virtualization environment. As an option, one or more variations of dynamic application discovery technique 1A00 or any aspect thereof may be implemented in the context of the architecture and functionality of the embodiments described herein. The dynamic application discovery technique 1A00 or any aspect thereof may be implemented in any environment.

The dynamic application discovery technique 1A00 is illustrated in FIG. 1A as an abstracted operational flow comprising certain representative steps associated with systems implementing the herein disclosed techniques. Specifically, dynamic application discovery technique 1A00 shows a developer 103 that publishes applications that can be implemented (e.g., installed) in various embodiments (e.g., as virtual machines or as containers) in a host computing system 104 (step 1). The boundary of the host computing system 104 is merely illustrative; other partitions are possible.

An app is a set of computer instructions that carry out a predetermined set of functions. An app can be delivered in embodiments that serve as an extension of functionality for a predefined software application. In some cases an app can use some or all functions of another app, and/or an app can use some or all functions of an application. Furthermore an app or application can be delivered as virtualized entities. For example, as earlier described, virtualized entities can comprise virtual machines (VMs), containers, and/or other entities. Further, an application can comprise a set of programming code (e.g., software) to perform one or more functions, which functions process one or more inputs to produce one or more results. Applications can sometimes be referred to as an "app" (app), or as "apps" (appS), "applications", "extensions", "programs", "plug-ins", "services", or "add-ons". In many cases, applications interact with other real or virtual resources, including other installed applications or other installed apps in the installation environment (e.g., host computing system 104) to facilitate performance of their intended functions.

Publishing an application can correspond to availing a certain version of an application to possible users. For example, publishing might comprise uploading the programming code pertaining to an application to a repository of applications, and registering the application by, for example, storing one or more application attributes (e.g., application attributes 174) describing the application in a manifest file 150 accessible by the possible users. A manifest file is a storage object comprising data structures for holding information. For example, manifest file 150 can be a human-readable and machine-readable text file with structured text to codify the application attributes 174. In some cases, manifest file 150 can refer to a machine-readable database with data tables that hold the application attributes 174.

Application attributes describe the application using a set of values, often organized in key-value pairs, where the key is the type of attribute and the value is the value pertaining to the application. For example, the attribute "version" might be associated with the value "2.1" for a given application to indicate the version of the application. The application attributes (e.g., key-value pairs) can be stored in various machine-readable and/or human-readable data structures in manifest file 150. For example, a data table structure might be used to store the application attributes where the key corresponds to a column in the table and the value corresponds to an entry in a row of the data table associated with the application. Other text-based formatted data structures, such as JSON or XML, can also be used to codify the application attributes in manifest file 150. To facilitate the herein disclosed techniques, application attributes 174 can comprise a set of discoverability objects $186_0$, which is further discussed infra.

Referring again to FIG. 1A, the information in manifest file 150, information pertaining to the host computing system 104, and/or other information can be used to enable visibility and/or enable other access controls or flags so as to present the applications to any number of possible users (step 2). For example, information pertaining to the installed apps in the host system might be used to group a collection of published applications described in manifest file 150 in a "Featured" group in an application marketplace (e.g., app browser 108). An application marketplace or app browser can comprise a user interface accessible by various users (e.g., user 102) that displays information pertaining to the applications available for installation in a given environment. As an example, user 102 can use app browser 108 to view and select application AppB (step 3), which can invoke installation of AppB in the host computing system 104.

Upon installation and registration (step 4), an application services gateway $106_1$ and/or other components in the host computing system 104 can create messaging data structures (e.g., queues) for the newly installed application (e.g., AppB) and other installed apps in the system (step 5). The messaging data structures can comprise any number of message queues to support queuing of messages placed onto the message queue by various senders (e.g., producers) and stored until retrieved by the recipient or recipients (e.g., consumers).

In FIG. 1A and herein, the senders and recipients might be applications and the messages might be referred to as application interaction messages. The message queues facilitate asynchronous communications between senders and recipients (e.g., between applications) so as to permit senders and recipients to interact with the message queue at unrelated moments in time. For example, an application can place an application interaction message in the message queue and continue other processing without receiving a response (e.g., message receipt confirmation), while another application can retrieve the application interaction message at some later moment in time that is unrelated to the moment in time the message was placed on the message queue.

Message queues can have implicit or explicit limits on the size of data that may be transmitted in a single message and/or the number of messages that may remain outstanding on the queue. In some cases, a message queue can be referred to as a mailbox. A message is a collection of information transferred electronically between a sender and a recipient. Specifically, the messages (e.g., application interaction messages) in the message queue comprise the data transported between the sender and the recipient (e.g., between the applications). For example, an application interaction message transported from one application to another application can be referred to as an inter-application message, and the act of transporting messages between applications can be referred to as inter-application messaging. The data comprising the messages can be structured according to various techniques (e.g., JSON, HTTP, etc.).

The data in the messages can also comprise various components, including a payload. A payload can be characterized as the portion of the message data comprising the content of the message as compared, for example, to the portion of the message data used to facilitate payload delivery. A newly installed application is an application installed in a given system that has been newly downloaded. An installed application in a given system is any application that is installed in the system. An installed application may or may not have discovered or been discovered by other installed applications. Such installed applications can be characterized as having an availability for use and/or for discovery.

The message queues created, in part, by application services gateway $106_1$ facilitate asynchronously broadcasting the availability of the newly installed application (e.g., AppB) to other apps in the system (step 6). The application services gateway can further use the message queues for the apps to facilitate asynchronous discoverability of certain apps based on a discoverability intent described in the discoverability object of each app (step 7). Further, the message queues for each application can facilitate asynchronous inter-application messaging as implemented by the herein disclosed techniques (step 8).

As earlier described, certain information in manifest file 150 can be used to present applications to users (e.g., in app browser 108). One embodiment of a technique for presenting applications to users to facilitate selection and installation is shown and described as pertaining to FIG. 1B.

Figure 1B:
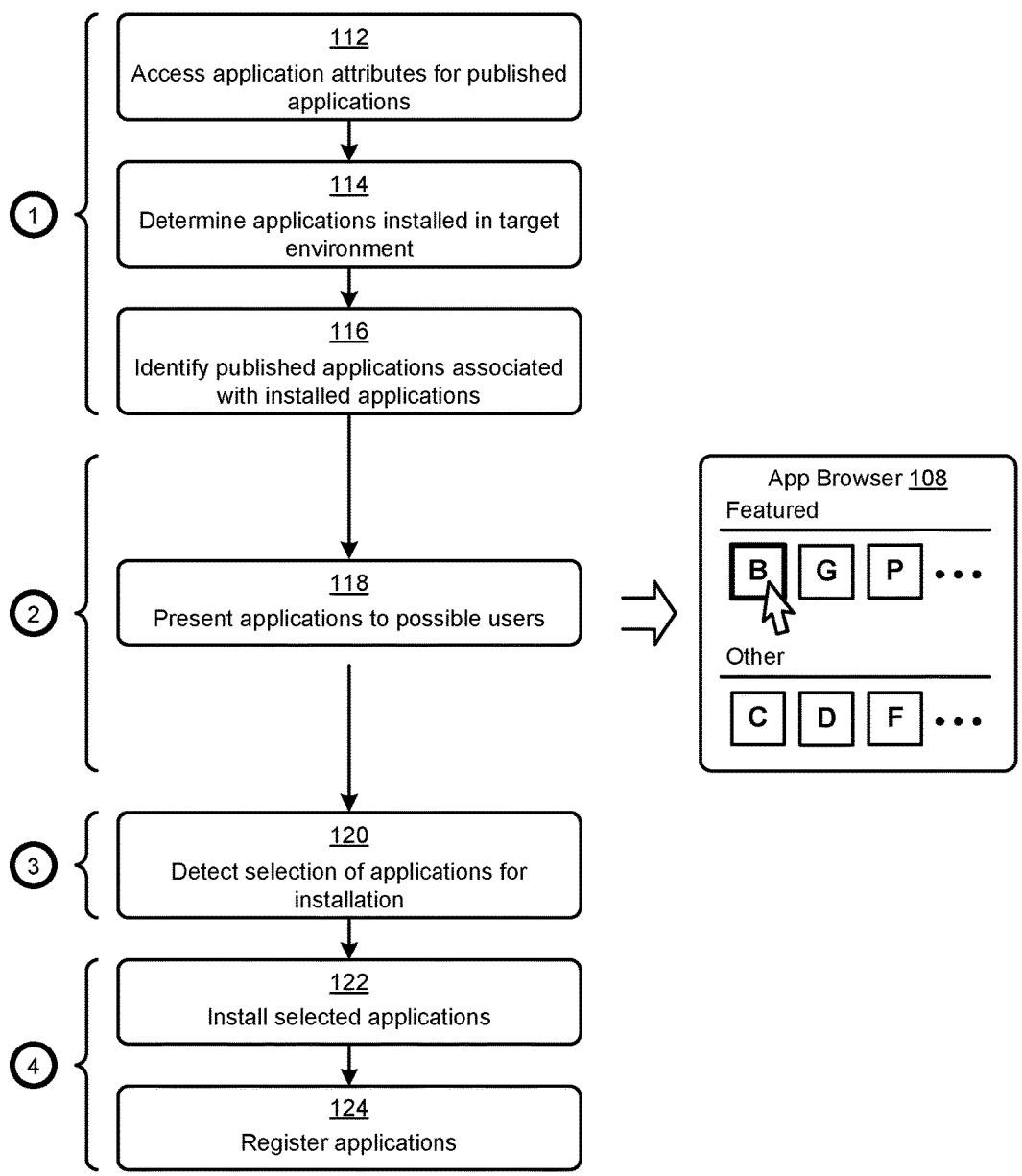
FIG. 1B presents an application presentation technique as implemented in systems that support an asynchronous interaction protocol for applications in a distributed virtualization environment, according to an embodiment.

FIG. 1B presents an application presentation technique 1B00 as implemented in systems that support an asynchronous interaction protocol for applications in a distributed virtualization environment. As an option, one or more variations of application presentation technique 1B00 or any aspect thereof may be implemented in the context of the architecture and functionality of the embodiments described herein. The application presentation technique 1B00 or any aspect thereof may be implemented in any environment.

The application presentation technique 1B00 presents one embodiment of certain steps for presenting applications to users to facilitate selection and installation in a distributed virtualization environment. Specifically, application presentation technique 1B00 can commence with accessing the application attributes pertaining to published applications (step 112). For example, such application attributes might be retrieved from a manifest file. The collection of applications installed (e.g., installed apps) in the target environment and/or system for installing additional apps can be determined (step 114). For example, a list of the application identifiers, names, and/or other attributes pertaining to the installed apps might be collected from an application registry or database in the target system. The foregoing information can be used to identify any of the published applications having some indication of a relationship with any of the installed apps (step 116). For example, the application attributes for some published apps might comprise discoverability objects that describe a discoverability intent associated with one or more of the installed apps, while other published apps might indicate no discoverability intent pertaining to the installed apps. Discoverability intent is a collection of application attributes characterizing the intent of the application as pertains to discoverability. Such attributes, for example, can be codified in the discoverability object of the application attributes stored in the manifest file.

As merely an example, published applications identified as having a relationship with one or more installed apps might be categorized as featured applications when presented to possible users (step 118). For example, as shown in app browser 108, various apps (e.g., AppB, AppG, AppP, etc.) are presented under a "Featured" heading, while other apps are presented under an "Other" heading. As such, the user experience can be enhanced by a determination (e.g., prior to deploying the application) that a particular application works with one or more other applications. When the selection of the application (e.g., from app browser 108) is detected (step 120), the selected application can be installed in the target system (step 122). The newly installed application can then be registered in a registered application database in the installation environment (step 124).

Various attributes pertaining to the newly installed application, including at least some of the application attributes for the application, can be stored in the application database. The data in the manifest file and/or the registered application database can be dynamically updated to further enhance the user experience. For example, such data might be updated when a new app or new app version is published to enhance the capability of an installed app that interacts with the new app or new app version.

Figure 1C:
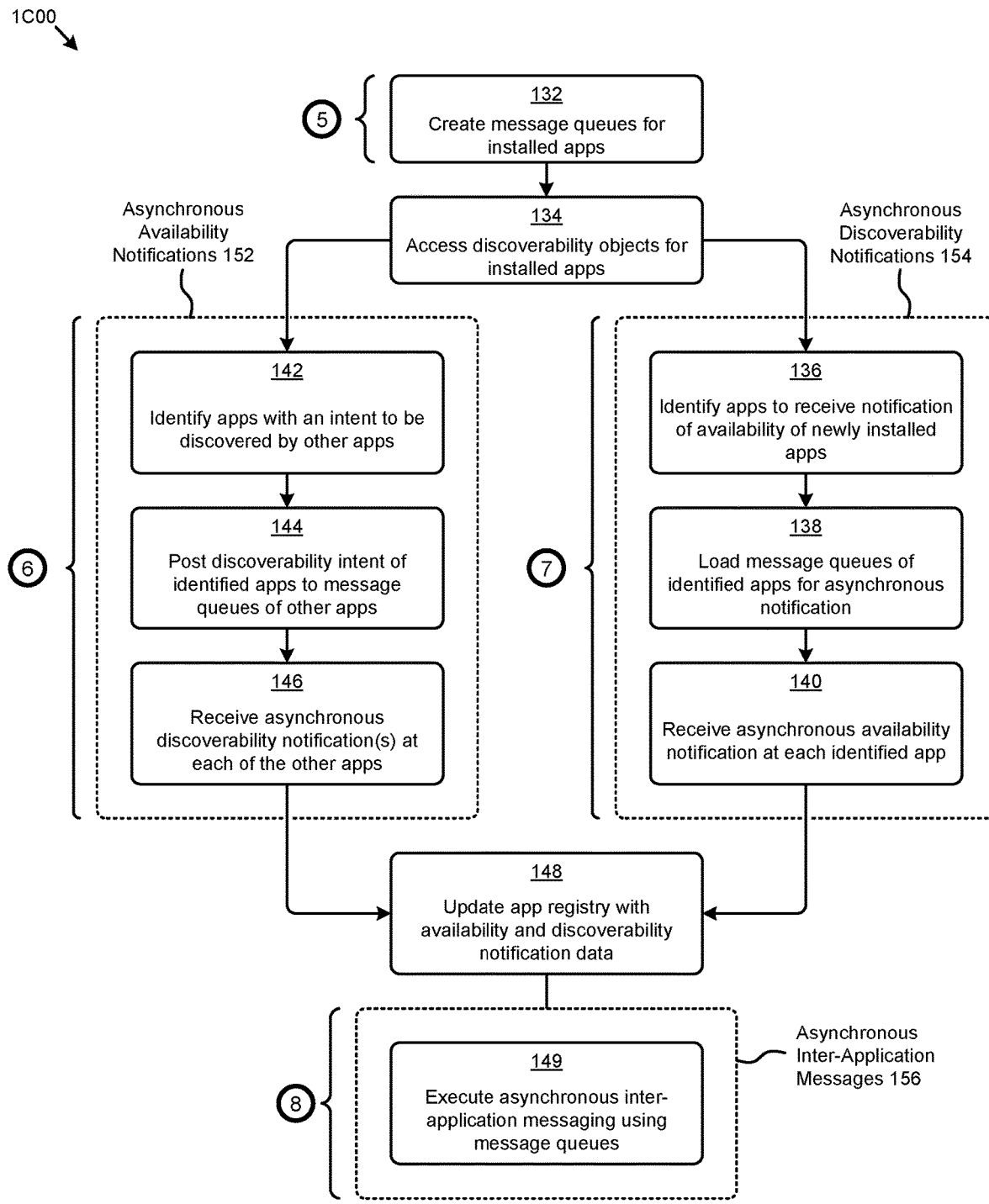
FIG. 1C presents an asynchronous application interaction technique as implemented in systems that support an asynchronous interaction protocol for applications in a distributed virtualization environment, according to an embodiment.

In addition to facilitating dynamic presentation of applications for selection prior to installation, the herein disclosed techniques can facilitate various asynchronous interactions of installed applications as shown and described as pertaining to FIG. 1C.

FIG. 1C presents an asynchronous application interaction technique 1C00 as implemented in systems that support an asynchronous interaction protocol for applications in a distributed virtualization environment. As an option, one or more variations of asynchronous application interaction technique 1C00 or any aspect thereof may be implemented in the context of the architecture and functionality of the embodiments described herein. The asynchronous application interaction technique 1C00 or any aspect thereof may be implemented in any environment.

The asynchronous application interaction technique 1C00 presents one embodiment of certain steps comprising asynchronous interactions between applications in a distributed virtualization system. Specifically, asynchronous application interaction technique 1C00 can commence with creating message queues for the installed applications (e.g., installed apps) in the system (step 132). As earlier mentioned, such message queues can facilitate asynchronous messaging between the applications. The discoverability objects (e.g., posted indications, messages, access keys, etc.) pertaining to the installed apps are accessed (at step 134). The message queues and the discoverability objects can be used to facilitate delivery of asynchronous availability notifications 152, asynchronous discoverability notifications 154, asynchronous inter-application messages 156, and/or other operations. The combination of such operations can be characterized as asynchronous application interactions.

Specifically, asynchronous availability notifications 152 might be facilitated by identifying apps to receive a notification of the availability of any newly installed apps (step 136). For example, the discoverability objects of the installed apps can be analyzed to identify apps having any of the newly installed apps in a discoverability list. The message queues of the identified apps can then be loaded with availability notification messages (step 138). The apps can then asynchronously retrieve availability notification messages from their respective message queue (step 140).

The asynchronous discoverability notifications 154 can commence with identifying apps having an intent (e.g., discoverability intent) to be discovered by other apps (step 142). For example, the discoverability objects of the installed apps can be analyzed to identify apps having other apps in a discoverability list. The discoverability intent of the identified apps can be posted to the message queues of the other apps in the discoverability lists (step 144). For example, the discoverability intent might be conveyed in an application interaction message that comprises a discoverability indicator and an application identifier corresponding to the app desiring to be discovered. An application identifier can be a unique identifier (e.g., n-gram, numeric string, alphanumeric string, etc.) associated with a given application and/or installed instance of an application to facilitate addressing the application and/or installed instance of an application. A discoverability indicator can be a sequence of one or more alphanumeric characters that can be interpreted to indicate a discoverability intent. For example, a key-value pair might be used to implement the discoverability indicator where, for example, the key is "discoverable" and the value is "true" or "false". The other apps can then asynchronously retrieve discoverability notification messages from their respective message queue (step 146).

At certain moments in time, the registered application database can be updated with certain availability and/or discoverability notification data associated with the foregoing operations (step 148). For example, an application services gateway with access to the message queues can monitor the message queue activity to track submission and receipt of notifications. Such tracking can facilitate efficient use of the system resources by, for example, eliminating redundant messages. Installed apps that are discovered by one another can further execute asynchronous inter-application messaging using the message queues according to the herein disclosed techniques (step 149). As earlier described, such application interaction messages transported asynchronously between applications can comprise various content (e.g., payloads).

The foregoing asynchronous application interaction technique and/or other herein disclosed techniques use various aspects of a discoverability object that can be included in application attributes associated with the applications, according to some embodiment. Examples of such discoverability objects are shown and described as pertaining to FIG. 2A.

FIG. 2A is a diagrammatic representation of data structures 2A00 for discoverability objects used in systems for facilitating an asynchronous interaction protocol for applications in a distributed virtualization environment. As an option, one or more variations of data structures 2A00 or any aspect thereof may be implemented in the context of the architecture and functionality of the embodiments described herein. The data structures 2A00 or any aspect thereof may be implemented in any environment.

FIG. 2A depicts example instances of application attributes (e.g., example application attributes $284_1$, . . . , example application attributes $284_N$) comprising discoverability objects (e.g., discoverability object $186_1$, . . . , discoverability object $186_N$). As shown, the application attributes can be stored in manifest file 150. The example application attributes correspond to a particular application as described in the attributes. Specifically, example application attributes $284_1$ correspond to an application having an application identifier of app1, a vendor identifier of dev456, and so on. Further, example application attributes $284_N$ correspond to an application having an application identifier of appN, a vendor identifier of dev123, and so on.

The discoverability objects in each example set of application attributes further describe a discoverability intent for the corresponding application. Specifically, application app1 desires to be discoverable (e.g., discoverable="true") by origin such as by a list of vendors (e.g., discover_type="vendor_list"). The shown "vendor_list" for app1" includes vendors whose apps are desired to be discoverable. This example includes vendor dev123, vendor dev987, and other vendors. The discoverability object $186_1$ further indicates that a payload comprising certain content (e.g., content1) can be shared with some or all of the apps pertaining to the vendors in the list. Also, and as indicated in discoverability object $186_N$, application appN desires to be discoverable (e.g., discoverable="true") by a list of apps (e.g., discover_type="app_list").

In addition to the shown "app_list" and "vendor_list" discovery type designations, other discovery types are supported. The list of apps that appN desires to be discovered by include app app1, app app47, and other vendors. The discoverability object $186_N$ further indicates a payload comprising certain content (e.g., contentN) that can be shared with some or all of the apps in the app list. As can be observed, analysis of the various discoverability objects can identify certain instances of discoverability relationships 288. Specifically, for example, app1 desires to be discovered by appN due to its listing of vendor dev123, and appN desires to be discovered by app1 due to its listing of dev123. As illustrated, the discoverability relationships 288 serve to match discovery intent from entities based on respective attributes/lists given in manifest files.

Figure 2B:
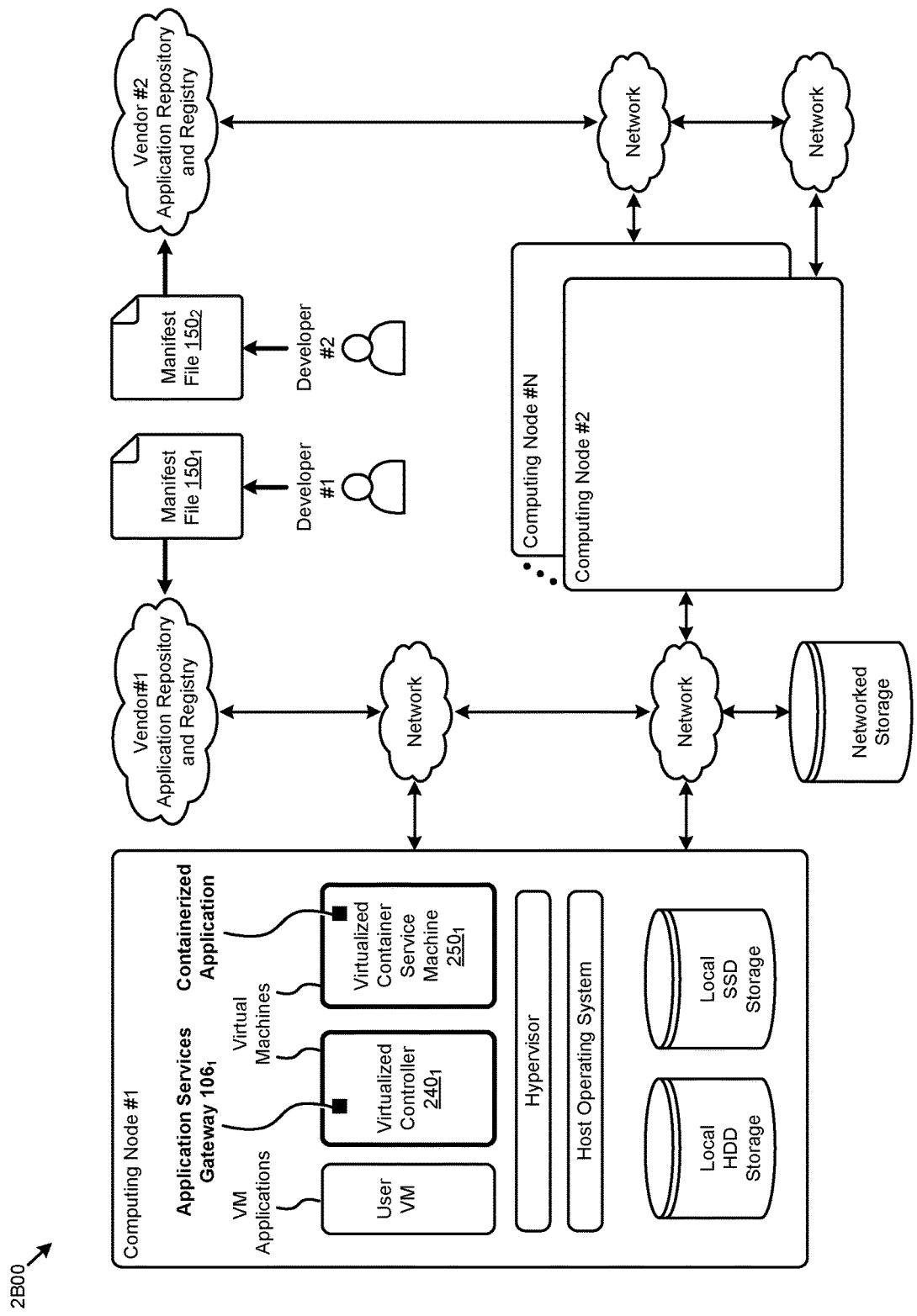
FIG. 2B is a block diagram showing a system for retrieving and maintaining applications in a distributed virtualization environment, according to an embodiment.

FIG. 2B is a block diagram 2B00 showing a system for retrieving and maintaining applications in a distributed virtualization environment. As shown, computing nodes (e.g., computing node #1, computing node #2, . . . , computing node # N) can access any number of application and repository registries (e.g., vendor #1 application and repository registry, vendor #2 application and repository registry) over a network. The registries can be populated by different developers (e.g., developer #1 and developer #2) and/or by different vendors. A particular developer might have an association with a particular vendor. As shown, a first developer generates a first manifest file $150_1$ and publishes to a first repository, whereas a second developer generates a second manifest file $150_2$ and publishes to a second repository. Any of the computing nodes can access any repository, and any of the computing nodes can host local hard disk drive (HDD) storage and/or local solid state device (SSD) storage, as well as networked storage. A downloaded application can be stored in any one or more of the foregoing storage devices.

Referring to the shown computing node #1, downloading an application from a registry can be accomplished using facilities of the virtualized controller $240_1$ and/or the virtualized container service machine $250_1$. Any aspects of downloading, encapsulating, wrapping, containerizing, and/or otherwise configuring an application for operation in the environment can be accomplished by the virtualized controller $240_1$ and/or the virtualized container service machine $250_1$ or both. In this example configuration, the virtualized controller and the virtualized container service machine are implemented as virtual machines, however either the virtualized controller and/or the virtualized container service machine can be implemented as a container (e.g., see FIG. 6B for an example embodiment of a container-implemented instance virtualized controller).

In many cases a downloaded application is implemented as a container, which is again wrapped into another container to form a containerized application for use within the distributed virtualization environment. In other cases, a downloaded application is implemented as a virtual machine. Such a downloaded instance of an application implemented as a virtual machine can be run as a user VM—with support services provided by a hypervisor and/or by the virtualized controller and/or by the virtualized container service machine, and/or by any portions of the host operating system, and/or by any other support facilities that can be provided by a container support system.

Figure 2C:
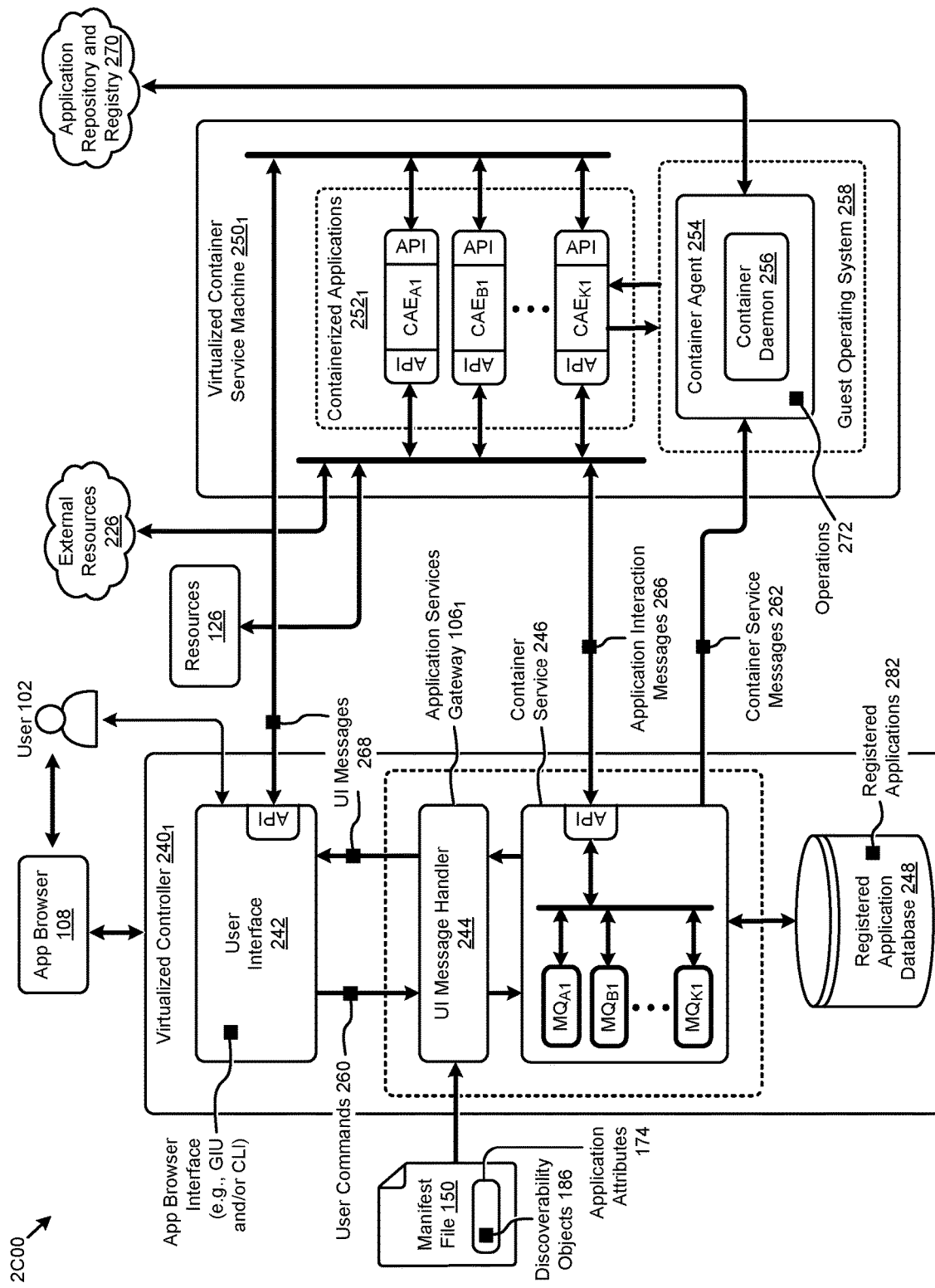
FIG. 2C is a block diagram of a host computer having a container support system used to facilitate an asynchronous interaction protocol for applications in a distributed virtualization environment, according to an embodiment.

One possible implementation of a container support system for facilitating the herein disclosed techniques is shown and described as pertaining to FIG. 2C.

FIG. 2C is a block diagram of a host computer 2C00 having a container support system used to facilitate an asynchronous interaction protocol for applications in a distributed virtualization environment. As an option, one or more variations of container support system or any aspect thereof may be implemented in the context of the architecture and functionality of the embodiments described herein. The container support system or any aspect thereof may be implemented in any environment.

The host computer and its container support system shown in FIG. 2C is one embodiment of a system that supports a containerized implementation (e.g., operating system virtualization) of the applications. As shown, a virtualized controller $240_1$ in the container support system includes a user interface 242 (UI) that provides a man-machine interface that can comprise a graphical user interface (GUI) and/or a command line interface (CLI) that facilitates interactions with a user such as a system administrator (e.g., user 102). More particularly, components or functions of user interface 242 can be used as an app browser (e.g., through the shown GUI or CLI) to permit the user 102 to interact with various components of the container support system so as to select, install, and otherwise operate applications in a distributed virtualization environment that implements the herein disclosed techniques.

Specifically, user 102 can interact with the aforementioned GUI and/or CLI to issue a set of user commands 260 to carry out various operations (e.g., operations 272) in a virtualized container service machine $250_1$ comprising a set of containerized applications $252_1$. For example, user 102 can interact any components of an app browser to select an application for installation. As such, user interface 242 facilitates downloading (e.g., from any one or more repositories of applications) an application, which downloading action serves to prepare (e.g., calculate and confirm checksum, etc.) the downloaded app for installation on the host computer. The host computer may or may not already host previously downloaded and/or installed apps.

Upon successful download, various operations on the host server are performed. Such operations can include making a determination that the downloaded app is compatible with the environment of the host computer. In some cases, further operations serve for making a determination that the downloaded app is configurable to communicate with previously installed apps. In such a case (e.g., when the downloaded app is configurable to communicate with other installed apps), then characteristics of the newly-downloaded app are used to establish a set of messaging data structures that facilitate asynchronous communications between the newly-downloaded app and any compatible previously installed apps. In some cases, certain agents in the distributed virtualization environment perform all or portions of the aforementioned downloading and preparation actions, which actions might be performed over applications delivered as VMs, or the actions might be performed over containerized applications. In this and other cases, certain agents in the distributed virtualization environment and/or one or more resource subsystems (e.g., clusters) in the distributed virtualization environment can autonomously invoke the operations 272 and/or other operations associated with containerized applications $252_1$.

In certain embodiments, an application services gateway $106_1$ comprising a UI message handler 244 and a container service 246 can be included in virtualized controller $240_1$. As shown, user commands 260 can be passed through the UI message handler 244 that can analyze the commands to determine the intent of the user as indicated by certain aspects of the commands. For example, UI message handler 244 can analyze the user commands 260 to identify the application selected by the user 102 and retrieve the associated instance of application attributes 174 from manifest file 150 for analysis. As shown, such application attributes 174 can comprise discoverability objects 186 associated with respective instances of the applications. The UI message handler 244 can interface with container service 246, which can in turn facilitate communications with the virtualized container service machine $250_1$.

For example, information derived from user commands 260, application attributes 174, and/or other sources can be used by container service 246 in such communications with virtualized container service machine $250_1$. Container service 246 can also perform certain management operations pertaining to the containerized applications associated with the distributed virtualization environment. For example, container service 246 can maintain a registered application database 248 that records the available and/or installed containerized applications (e.g., registered applications 282). As an example, the registered application database 248 can store various attributes pertaining to the registered instances of containerized applications $252_1$ such as attributes describing an application identifier (e.g., containerized application identifier), an availability status, a notification status, an extension port, an underlying application identifier, an image identifier, an image size (e.g., in MB), and/or other characteristics. The registered application database 248 can also include "flags" associated with the registered containerized applications to indicate various lifecycle attributes (e.g., available, downloaded, installed, running, paused, restricted, obsolete, pending deletion, etc.) and/or other attributes.

The container service 246 can further manage the distribution of the containerized applications among instances of virtualized container service machines throughout the distributed virtualization environment. In some cases, container service 246 can invoke operations to create and/or delete one or more virtualized container service machines. For example, such scaling of virtualized container service machines might be based at least in part on the CPU and/or memory resources required by the containerized applications running and/or installed in the distributed virtualization system.

In some embodiments, and as shown, communication of one or more instances of container service messages 262 between virtualized controller $240_1$ and virtualized container service machine $250_1$ can be facilitated by container service 246 at the virtualized controller $240_1$ and a container agent 254 at the virtualized container service machine $250_1$. Strictly as an example, communications between container service 246 and container agent 254 can rely on interprocess communications (IPC), sockets, REST APIs, data messages passing through shared memory, IP protocols, tunnels, and/or other communication methods.

Specifically, container service 246 can issue the container service messages 262 to container agent 254 to perform various operations (e.g., operations 272) pertaining to containerized applications $252_1$. Specifically, one or more instances of container service messages 262 from container service 246 to container agent 254 might invoke an operation to request a "list" of published applications, or invoke an operation to "download" one or more containerized application images from an application repository and registry 270 (e.g., Docker hub). Such repositories and/or registries can be public or private. The container service messages 262 raised by a container agent 254 might invoke an "install" operation, a "start" operation, a "stop" operation, a "pause" operation, or a "delete" operation pertaining to one or more containerized applications. Other operations are possible, including operations that are in coordination with a container daemon.

In certain embodiments, container agent 254 can comprise a container daemon 256 that facilitates the execution of the foregoing operations. Container daemon 256 can also facilitate communication with application repository and registry 270. Container daemon 256 (e.g., a Docker daemon) can facilitate invoking and running the containerized application entities (e.g., $CAE_{A1}$, $CAE_{B1}$, . . . , $CAE_{K1}$) installed in virtualized container service machine $250_1$. In some embodiments, virtualized container service machine $250_1$ can be a virtual machine running on a guest operating system 258, where container agent 254 comprises portions of the guest operating system (e.g., Linux OS) or is part of the guest operating system. In some embodiments, the container daemon 256 runs portions of the guest operating system.

Containerized applications, together with any constituent virtualized entities can be installed in the virtualized container service machine $250_1$, and can have various application programming interfaces (APIs) to communicate with components in the distributed virtualized system. Specifically, any forms of installed containerized application entities can have an API (e.g., a representational state transfer (REST) API) that receives instances of application interaction messages 266 from a corresponding API at container service 246. For example, application interaction messages 266 might correspond to instances of user commands 260 issued from user interface 242 to interact with a specific containerized application entity. The addressed containerized application entity can respond through any provided APIs to deliver UI messages 268 (e.g., JSON messages comprising HTML5, CSS, JS, etc.) to user interface 242. In some cases, responses from a containerized application entity can be delivered as instances of application interaction messages 266 through an application services gateway $106_1$ to user interface 242. As further shown, containerized applications $252_1$ can access a set of resources 126 (e.g., resources internal to the resource subsystem in the distributed virtualization environment) and a set of external resources 226 (e.g., resources from third-party data providers) through a receiving API.

To facilitate the herein disclosed techniques, a set of message queues (e.g., $MQ_{A1}$, $MQ_{B1}$, . . . , $MQ_{K1}$) for each of the containerized applications $252_1$ can be created at the container service 246 of application services gateway $106_1$. The message queues can be used to facilitate asynchronous interactions with the containerized applications $252_1$. For example, application services gateway $106_1$ might post availability notifications and/or discoverability notifications to the message queues to be asynchronously received as instances of application interaction messages 266 by the containerized applications $252_1$. Further, the message queues might asynchronously queue instances of application interaction messages 266 from a first set of apps to be asynchronously received by a second set of apps to facilitate inter-application messaging.

The aforementioned container agent 254 and/or a daemon and/or any component that interfaces with container agent 254 might be preconfigurable for some specific purpose or purposes. For example, a container agent can be preconfigured to run with specific access privileges and/or preconfigured to run with a particular set of hardware resources or quotas, or with any configurable or parameterizable characteristic. Strictly as additional examples, the container agent 254 can employ a GUI and/or a CLI to assist with and/or perform any of the following: (1) create, replace, update, or delete (CRUD) operations for a named container service machine; (2) perform CRUD operations for creating a named pool of applications; (3) deploy a containerized application as a named container within a named pool; (4) stop/start/pause/remove operations on a containerized application using a container ID; (5) create container volumes in persistent storage; (5) collect and report statistics pertaining to a specific container or pertaining to a particular container service machine, or from one or more container machine pools; and/or (6) specify one or more registries for permitted access or prohibited access or partial access.

Any of the above operations can be invoked or entered via a GUI or via a CLI, or both. In some cases, certain operations (e.g., create a Docker container) can be performed or facilitated by a user using a "Docker CLI". Moreover, a GUI or a CLI or both can be configured to allow an authorized user to run the Docker CLI remotely on a specific container machine. In some cases a set of private/public key pairs are used for authentication and/or authorization.

Further details regarding general approaches to container support architectures in virtualization environments are described in U.S. application Ser. No. 15/173,577 titled "ARCHITECTURE FOR MANAGING I/O AND STORAGE FOR A VIRTUALIZATION ENVIRONMENT USING EXECUTABLE CONTAINERS AND VIRTUAL MACHINES", filed on Jun. 3, 2016, which is hereby incorporated by reference in its entirety.

The container support system shown in FIG. 2C presents merely one partitioning and virtualization approach. The specific example shown is purely exemplary, and other subsystems and/or partitioning and/or virtualization approaches are reasonable. One embodiment of an environment depicting such systems, subsystems, partitionings, and/or virtualization approaches is shown and described as pertaining to FIG. 3.

Figure 3:
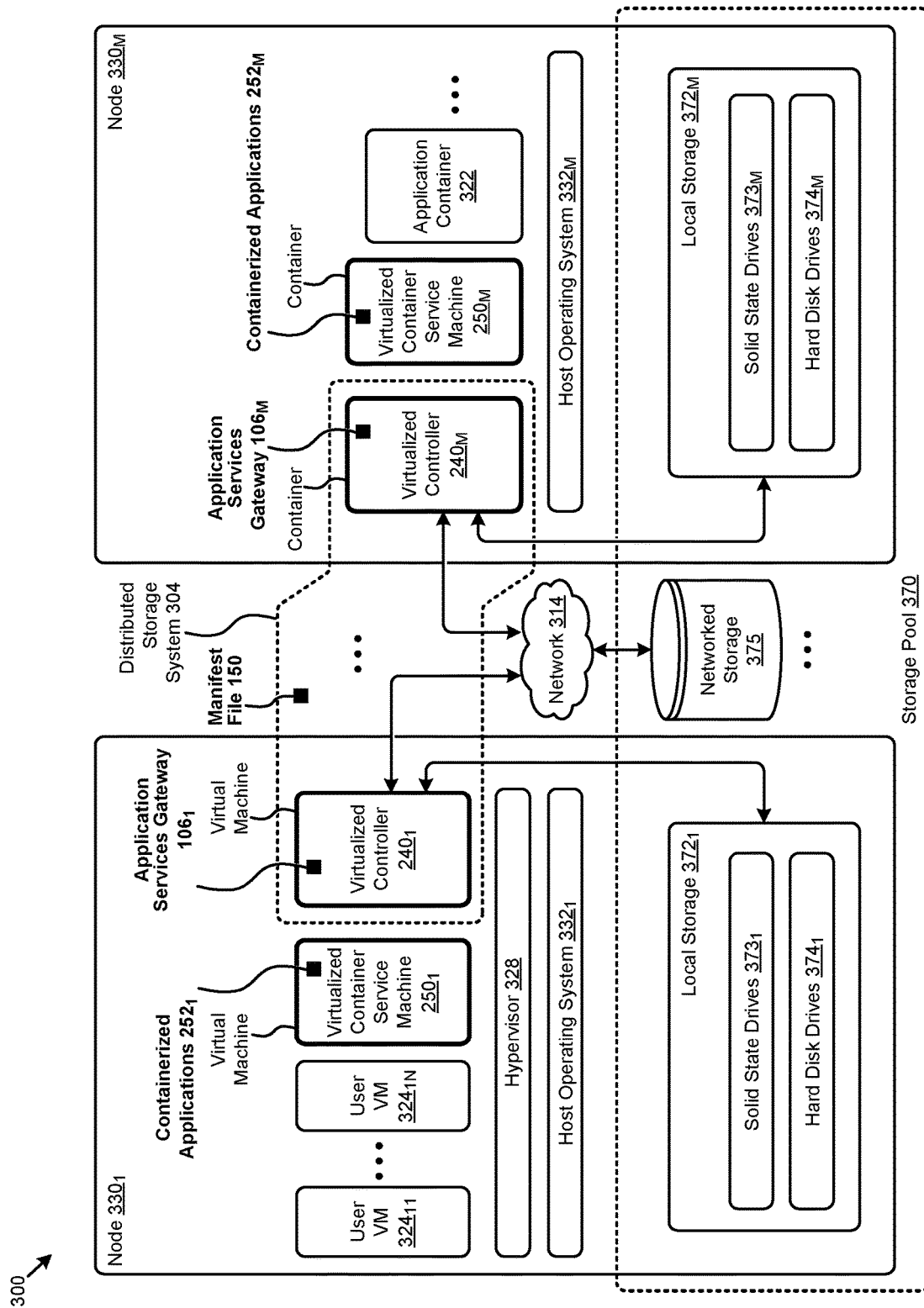
FIG. 3 depicts a distributed virtualization environment in which embodiments of the present disclosure can operate.

FIG. 3 depicts a distributed virtualization environment 300 in which embodiments of the present disclosure can operate. As an option, one or more variations of distributed virtualization environment 300 or any aspect thereof may be implemented in the context of the architecture and functionality of the embodiments described herein.

The distributed virtualization environment 300 shows various components associated with one instance of a distributed virtualization system (e.g., hyperconverged distributed system) comprising a distributed storage system 304 that can be used to implement the herein disclosed techniques. Specifically, the distributed virtualization environment 300 comprises multiple nodes (e.g., node $330_1$, ..., node $330_M$) that have multiple tiers of storage in a storage pool 370. For example, each node can be associated with one server, multiple servers, or portions of a server. A group of such nodes can be called a cluster.

As shown, multiple tiers of storage include storage that is accessible through the network 314 such as a networked storage 375 (e.g., a storage area network or SAN, network attached storage or NAS, etc.). The multiple tiers of storage further include instances of local storage (e.g., local storage $372_1$, ..., local storage $372_M$). For example, the local storage can be within or directly attached to a server and/or appliance associated with the nodes. Such local storage can include solid state drives (e.g., solid state drives $373_1$, ..., solid state drives $373_M$), hard disk drives (e.g., hard disk drives $374_1$, ..., hard disk drives $374_M$), and/or other storage devices. Specifically, the solid state drive storage might store instances of distributed metadata used in managing the distributed storage system 304.

As shown, the nodes in distributed virtualization environment 300 can implement multiple virtualized entities such as one or more user virtual machines (e.g., user VM $324_{11}$, ..., user VM $324_{1N}$) and/or application containers (e.g., application container 322, etc.). The user VMs can be characterized as software-based computing "machines" implemented in a full virtualization environment that emulates the underlying hardware resources (e.g., CPU, memory, etc.) of the nodes. For example, multiple user VMs can operate on one physical machine (e.g., node host computer) running a single host operating system (e.g., host operating system $332_1$, ..., host operating system $332_M$), while the user VMs run multiple applications on various respective guest operating systems. Such flexibility can be facilitated at least in part by a hypervisor (e.g., hypervisor 328), which hypervisor is logically located between the various guest operating systems of the user VMs and the host operating system of the physical infrastructure (e.g., node).

As an example, hypervisors can be implemented using virtualization software (e.g., VMware ESXi, Microsoft Hyper-V, RedHat KVM, Nutanix AHV, etc.) that includes a hypervisor. In comparison, the application containers are implemented at the nodes in an operating system virtualization or container virtualization environment. The application containers comprise groups of processes and/or resources (e.g., memory, CPU, disk, etc.) that are isolated from the node host computer and other containers. Such containers directly interface with the kernel of the host operating system with, in most cases, no hypervisor layer. This lightweight implementation can facilitate efficient distribution of certain software components such as applications or services (e.g., micro-services). As shown, distributed virtualization environment 300 can implement both a full virtualization environment and a container virtualization environment for various purposes. In some cases, multiple virtualization environments (e.g., full virtualization and operating system virtualization) can be implemented in a given node.

Distributed virtualization environment 300 also comprises at least one instance of a virtualized controller to facilitate access to storage pool 370 by the user VMs, the application containers, and/or other components of the distributed system. Multiple instances of such virtualized controllers can coordinate within a cluster to form the distributed storage system 304 which can, among other operations, manage the storage pool 370 and/or other resources in the system. This architecture further facilitates efficient scaling of the distributed virtualization system.

The foregoing virtualized controllers can be implemented in distributed virtualization environment 300 using various techniques. Specifically, an instance of a virtual machine at a given node can be used as a virtualized controller in a full virtualization environment to manage storage resources and I/O activities. In this case, for example, the user VMs at node $330_1$ can interface with virtualized controller $240_1$ implemented as a virtual machine through hypervisor 328 to access the storage pool 370. In such cases, the controller virtual machine is not formed as part of specific implementations of a given hypervisor. Instead, the controller virtual machine can run as a virtual machine above the hypervisor at the various node host computers. When the controller virtual machines run above the hypervisors, varying virtual machine architectures and/or hypervisors can operate with the distributed storage system 304. For example, a hypervisor at one node in the distributed storage system 304 might correspond to VMware ESXi software, and a hypervisor at another node in the distributed storage system 304 might correspond to Nutanix AHV software.

As another virtualized controller implementation example, containers (e.g., Docker containers) can be used to implement a virtualized controller (e.g., virtualized controller $240_M$) in an operating system virtualization environment at a given node. In this case, for example, the user VMs at node $330_M$ can access the storage pool 370 by interfacing with a controller container (e.g., virtualized controller $240_M$) through a hypervisor at node $330_M$ and/or the kernel of host operating system $332_M$. In some embodiments, multiple instances of the virtualized controller in the distributed virtualization environment can comprise an application services gateway (e.g., application services gateway $106_1$, ..., application services gateway $106_M$) to facilitate asynchronous application interactions. A manifest file 150 can also be accessible by the distributed storage system 304 to facilitate implementation of the herein disclosed techniques.

In certain embodiments, one or more instances of a virtualized container service machine can be implemented in distributed virtualization environment 300 to facilitate the herein disclosed techniques. Specifically, virtualized container service machine $250_1$ can be implemented at node $330_1$, and virtualized container service machine $250_M$ can be implemented at node $330_M$. As shown, virtualized container service machine $250_1$ can be implemented as a virtual machine in a full virtualization environment, while virtualized container service machine $250_M$ can be implemented as a container in an operating system virtualization environment. Such instances of the virtualized container service machine can be implemented in any node in any cluster. In certain embodiments, multiple instances of the virtualized container service machine can be created (e.g., by a virtualized controller) to carry out various operations pertaining to facilitating asynchronous interactions by containerized applications (e.g., containerized applications $252_1$, . . . , containerized applications $252_M$) according the herein disclosed techniques.

Figure 4A:
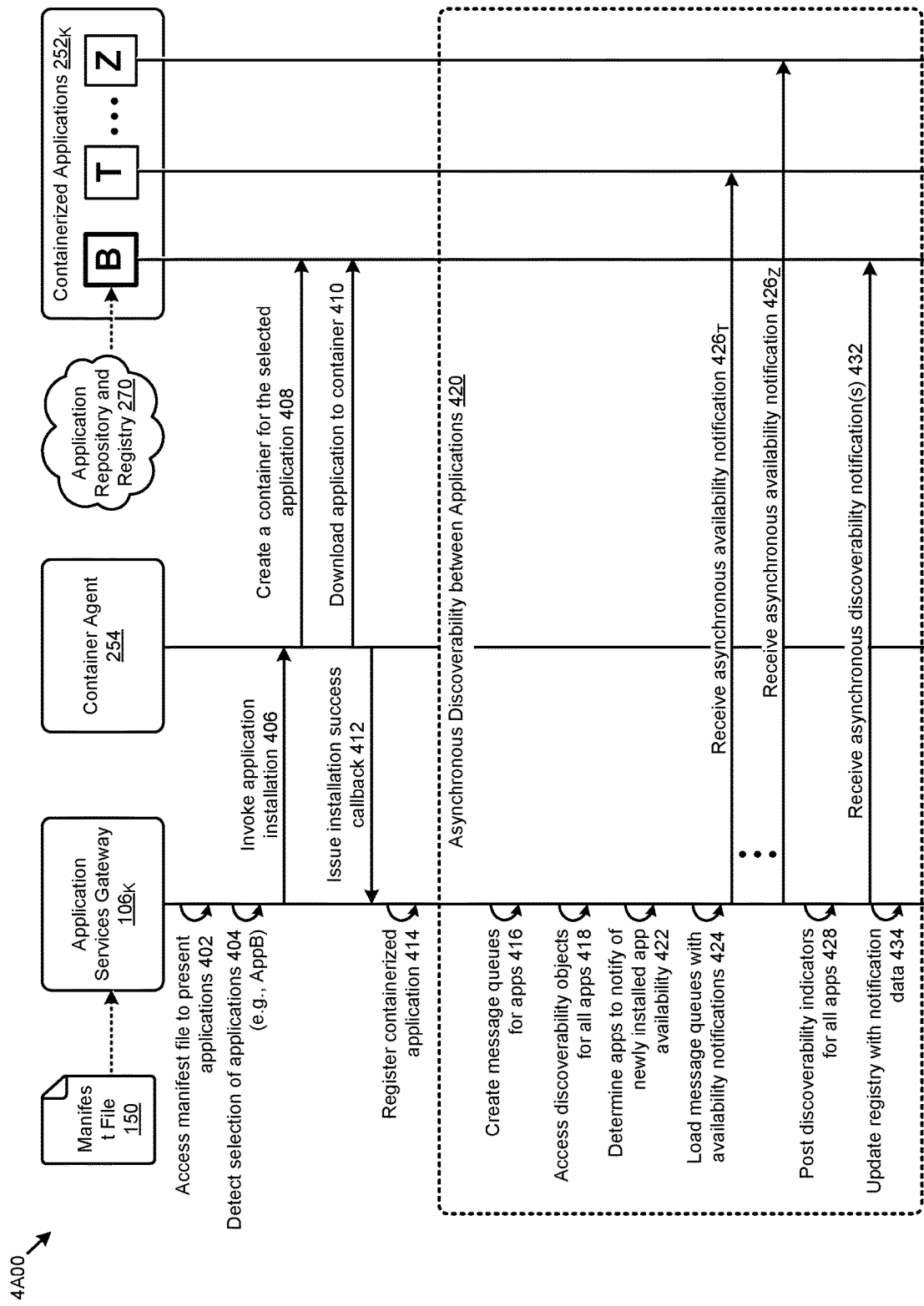
FIG. 4A is an interaction diagram showing system component interactions that facilitate application discoverability in a distributed virtualization environment, according to an embodiment.
Figure 4B:
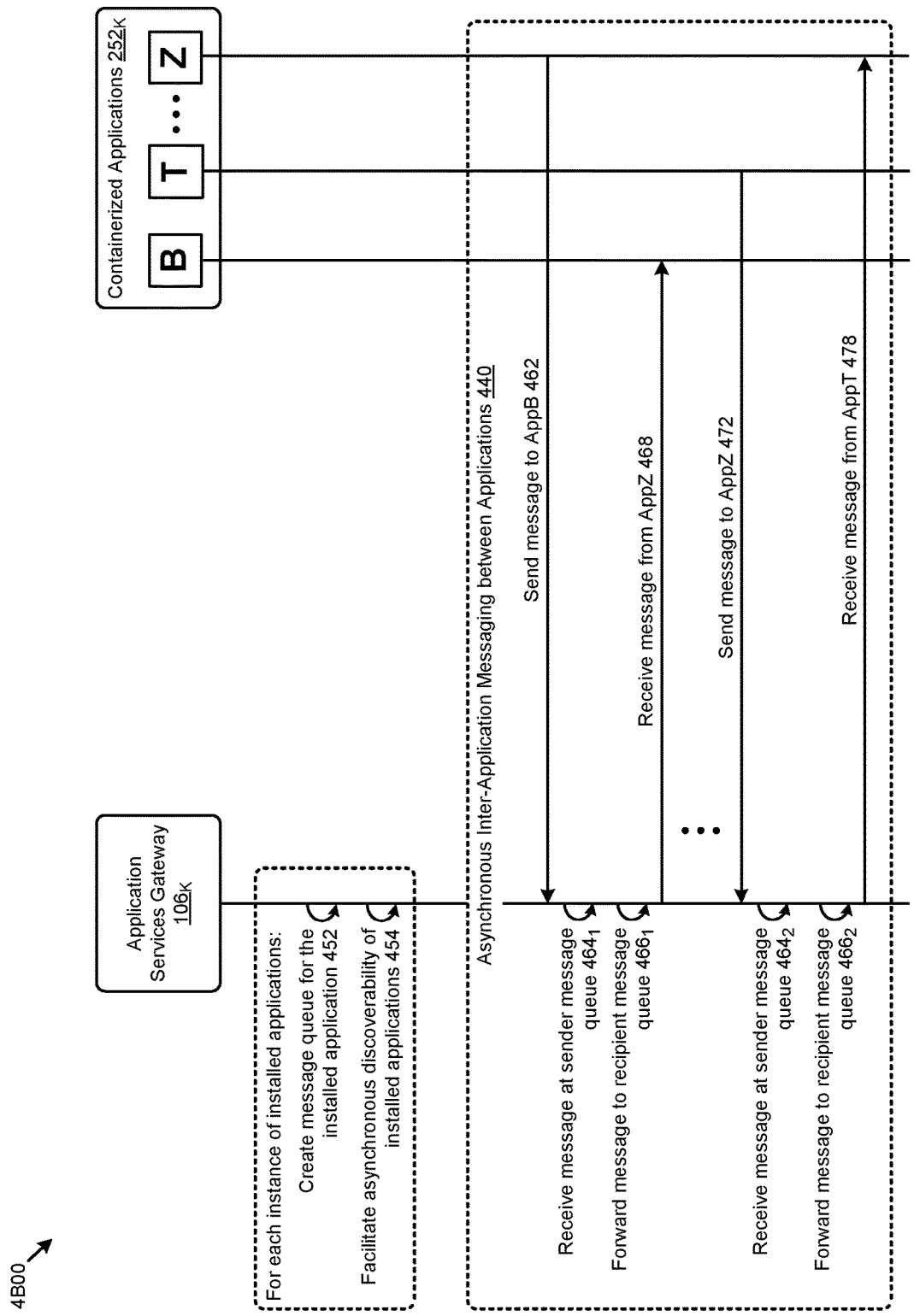
FIG. 4B is a diagrammatic representation of component-to-component interactions that facilitate inter-application communications for applications in a distributed virtualization environment, according to an embodiment.

Example embodiments of system component interactions facilitated by the herein disclosed techniques are shown and described as pertaining to FIG. 4A and FIG. 4B.

FIG. 4A is an interaction diagram 4A00 showing system component interactions that facilitate application discoverability in a distributed virtualization environment. As an option, one or more variations of interaction diagram 4A00 or any aspect thereof may be implemented in the context of the architecture and functionality of the embodiments described herein. The interaction diagram 4A00 or any aspect thereof may be implemented in any environment.

Interaction diagram 4A00 presents various distributed virtualization system and container support system components earlier described that can exhibit a set of high order interactions (e.g., operations, messages, etc.) to facilitate the herein disclosed techniques. Specifically shown are an instance of application services gateway 106k accessing the manifest file 150, an instance of container agent 254, and a representative set of containerized applications $252_K$. The application repository and registry 270 is also shown. As can be observed in the interaction diagram 4A00, application services gateway 106k can access the manifest file to present applications for selection by various users (operation 402). When an application selection is detected (operation 404), an application installation operation can be invoked at container agent 254 (message 406). For example, a particular user might select AppB for installation. The container agent 254 can then create a container for the selected application (message 408) and download the application for wrapping by the container (message 410). For example, an image file comprising the programming code (e.g., application components) corresponding to AppB can be pulled from the application repository and registry 270 and installed as a containerized application entity (e.g., "B" or AppB) within containerized applications $252_K$. As shown, containerized applications $252_K$ also comprises other installed apps (e.g., "T" or AppT, "Z" or AppZ). Upon successful installation, a callback can be issued to application services gateway 106k (message 412) and the newly installed app (e.g., containerized application) can be registered (operation 414).

According to the herein disclosed techniques, asynchronous discoverability between applications can be facilitated, at least in part, by the messages and operations comprising the asynchronous discoverability between applications 420. Specifically, message queues can be created at the application services gateway $106_K$ for each installed app (operation 416).

Discoverability objects for all installed apps can be accessed (operation 418) from a stored location. For example, the discoverability objects can be included in the application attributes stored in the manifest file. The aforementioned manifest file might contain data entries in addition to entries pertaining to discoverability. For example, a manifest file might include attributes and respective values that correspond to private content (e.g., pertaining to internally developed application components) and/or a manifest file might include attributes and respective values that correspond public content (e.g., pertaining to publicly available portions of applications).

In some cases, a manifest file is not used and/or is processed onto a database object. As such, some or all of discoverability objects can be stored in a registered application database in the installation environment. The discoverability object data and/or other information can be used to determine which apps to notify of an availability pertaining to any newly installed apps, such as AppB (operation 422). For example, the application lists and vendor lists in the discoverability objects can be scanned to identify apps having AppB or the vendor for AppB, respectively, in their list or lists. The message queues of the identified apps (e.g., AppT, AppZ, etc.) can then be loaded with respective availability notification messages for asynchronous notification (operation 424).

The availability notification messages can comprise the application identifier of the sender, the application identifier of the recipient, a payload associated with the sender and/or recipient, and/or other content. At various moments in time, the availability notification messages can be asynchronously received by the identified apps (message $426_T$ and message $426_Z$). The application services gateway $106_K$ can also post to the message queues as set of discoverability indications for all apps desiring to be discovered (operation 428). For example, discoverability messages can be posted to the message queues of other apps identified by the application identifier or associated vendor identifier in the discoverability object of a given app to indicate an intent by the app to be discovered by those other apps. In such cases certain apps, such as AppB, might asynchronously receive one or more discoverability notifications (message 432). The notification data in the registered application database or other sort of registry can be updated based at least in part on any of the foregoing notification activity (operation 434).

FIG. 4B is a diagrammatic representation 4B00 of component-to-component interactions that facilitate inter-application communications in a distributed virtualization environment. As an option, one or more variations of diagrammatic representation 4B00 or any aspect thereof may be implemented in the context of the architecture and functionality of the embodiments described herein. The diagrammatic representation 4B00 or any aspect thereof may be implemented in any environment.

FIG. 4B presents various distributed virtualization system and container support system components earlier described that can exhibit a set of high order interactions (e.g., operations, messages, etc.) to facilitate the herein disclosed techniques. Specifically shown are an instance of application services gateway $106_K$ and a representative set of containerized applications $252_K$ (e.g., AppB, AppT, . . . , AppZ). As can be observed, for each installed application instance (e.g., containerized applications $252_K$), application services gateway $106_K$ can create a message queue (operation 452). Application services gateway $106_K$ can also facilitate asynchronous discoverability of the installed apps using any of the herein disclosed techniques (operation 454). For example, the message queues managed at least in part by the application services gateway $106_K$ can be used to facilitate asynchronous discoverability between the applications.

The message queues can also facilitate asynchronous inter-application message between applications. According to the herein disclosed techniques, such asynchronous inter-application messaging can be implemented, at least in part, as shown in the messages and operations comprising grouping 440. Specifically, for example, AppZ might send a message that is addressed to AppB (message 462). The message is received at the message queue of the sender, or AppZ (operation $464_1$). Based on the message payload (e.g., application identifier of the target recipient), the message can be forwarded to the message queue of the recipient or AppB (operation $466_1$). At some later moment in time, the recipient (e.g., AppB) can asynchronously receive the message from AppZ (message 468). As another example, AppT might send a message to AppZ (message 472). The message is received at the message queue of the sender, or AppT (operation 464$_2$). Based on the message payload (e.g., application identifier of the target recipient), the message can be forwarded to the message queue of the recipient, or AppZ (operation 466$_2$). At some later moment in time, the recipient (e.g., AppZ) can asynchronously receive the message from AppT (message 478).

Additional Embodiments of the Disclosure

Additional Practical Application Examples

Figure 5A:
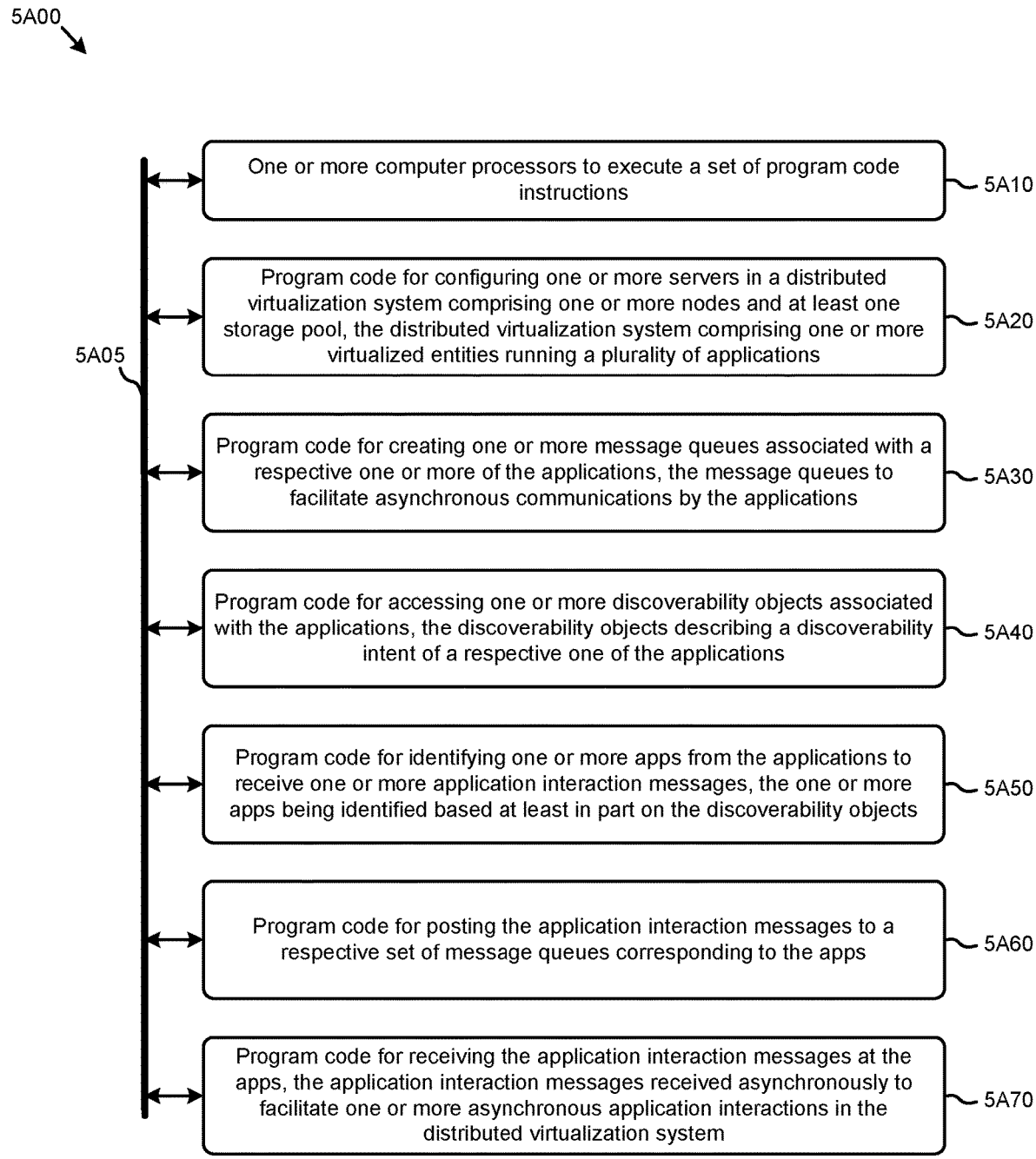
FIG. 5A and FIG. 5B depict system components as arrangements of computing modules that are interconnected so as to implement certain of the herein-disclosed embodiments.

FIG. 5A depicts a system 5A00 as an arrangement of computing modules that are interconnected so as to operate cooperatively to implement certain of the herein-disclosed embodiments. This and other embodiments present particular arrangements of elements that individually, and/or as combined, serve to form improved technological processes that address authenticating instances of an application. The partitioning of system 5A00 is merely illustrative and other partitions are possible. As an option, the system 5A00 may be implemented in the context of the architecture and functionality of the embodiments described herein. Of course, however, the system 5A00 or any operation therein may be carried out in any desired environment.

The system 5A00 comprises at least one processor and at least one memory, the memory serving to store program instructions corresponding to the operations of the system. As shown, an operation can be implemented in whole or in part using program instructions accessible by a module. The modules are connected to a communication path 5A05, and any operation can communicate with other operations over communication path 5A05. The modules of the system can, individually or in combination, perform method operations within system 5A00. Any operations performed within system 5A00 may be performed in any order unless as may be specified in the claims.

The shown embodiment implements a portion of a computer system, presented as system 5A00, comprising a computer processor to execute a set of program code instructions (module 5A10) and modules for accessing memory to hold program code instructions to perform: configuring one or more servers in a distributed virtualization system comprising one or more nodes and at least one storage pool, the distributed virtualization system comprising one or more virtualized entities running a plurality of applications (module 5A20); creating one or more message queues associated with a respective one or more of the applications, the message queues to facilitate asynchronous communications by the applications (module 5A30); accessing one or more discoverability objects associated with the applications, the discoverability objects describing a discoverability intent of a respective one of the applications (module 5A40); identifying one or more apps from the applications to receive one or more application interaction messages, the one or more apps being identified based at least in part on the discoverability objects (module 5A50); posting the application interaction messages to a respective set of message queues corresponding to the apps (module 5A60); and receiving the application interaction messages at the apps, the application interaction messages received asynchronously to facilitate one or more asynchronous application interactions in the distributed virtualization system (module 5A70).

Variations of the foregoing may include more or fewer of the shown modules, and variations may perform more or fewer (or different) steps, and/or may use data elements in more, or in fewer (or different) operations.

Figure 5B:
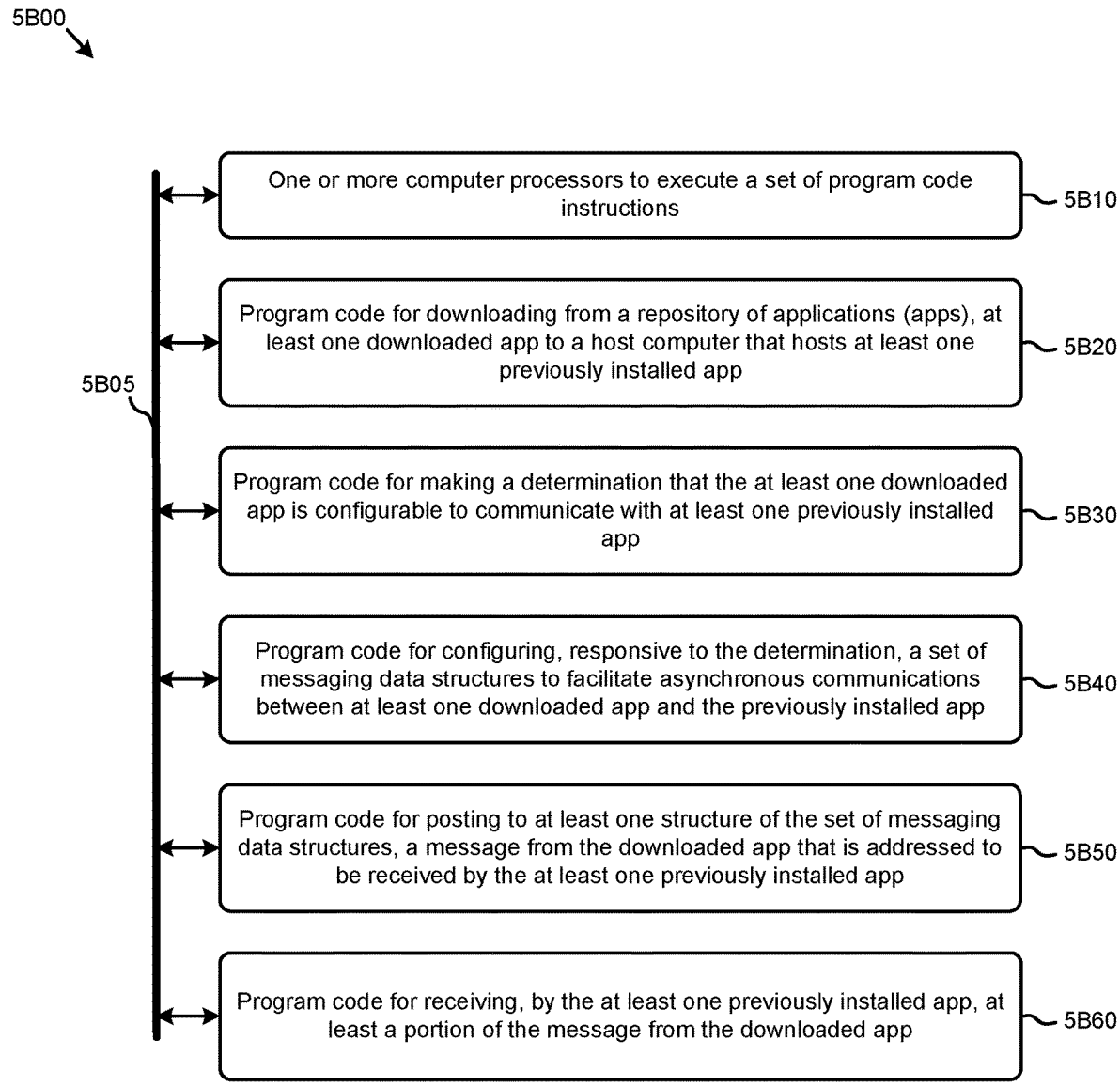

FIG. 5B depicts a system 5B00 as an arrangement of computing modules that are interconnected so as to operate cooperatively to implement certain of the herein-disclosed embodiments. The partitioning of system 5B00 is merely illustrative and other partitions are possible. As an option, the system 5B00 may be implemented in the context of the architecture and functionality of the embodiments described herein. Of course, however, the system 5B00 or any operation therein may be carried out in any desired environment.

The system 5B00 comprises at least one processor and at least one memory, the memory serving to store program instructions corresponding to the operations of the system. As shown, an operation can be implemented in whole or in part using program instructions accessible by a module. The modules are connected to a communication path 5B05, and any operation can communicate with other operations over communication path 5B05. The modules of the system can, individually or in combination, perform method operations within system 5B00. Any operations performed within system 5B00 may be performed in any order unless as may be specified in the claims.

The shown embodiment implements a portion of a computer system, presented as system 5B00, comprising a computer processor to execute a set of program code instructions (module 5B10) and modules for accessing memory to hold program code instructions to perform: downloading from a repository of applications (apps), at least one downloaded app to a host computer that hosts at least one previously installed app (module 5B20); making a determination that the at least one downloaded app is configurable to communicate with at least one previously installed app (module 5B30); configuring, responsive to the determination, a set of messaging data structures to facilitate asynchronous communications between at least one downloaded app and the previously installed app (module 5B40); posting to at least one structure of the set of messaging data structures, a message from the downloaded app that is addressed to be received by the at least one previously installed app (module 5B50); and receiving, by the at least one previously installed app, at least a portion of the message from the downloaded app (module 5B60).

System Architecture Overview

Additional System Architecture Examples

Figure 6A:
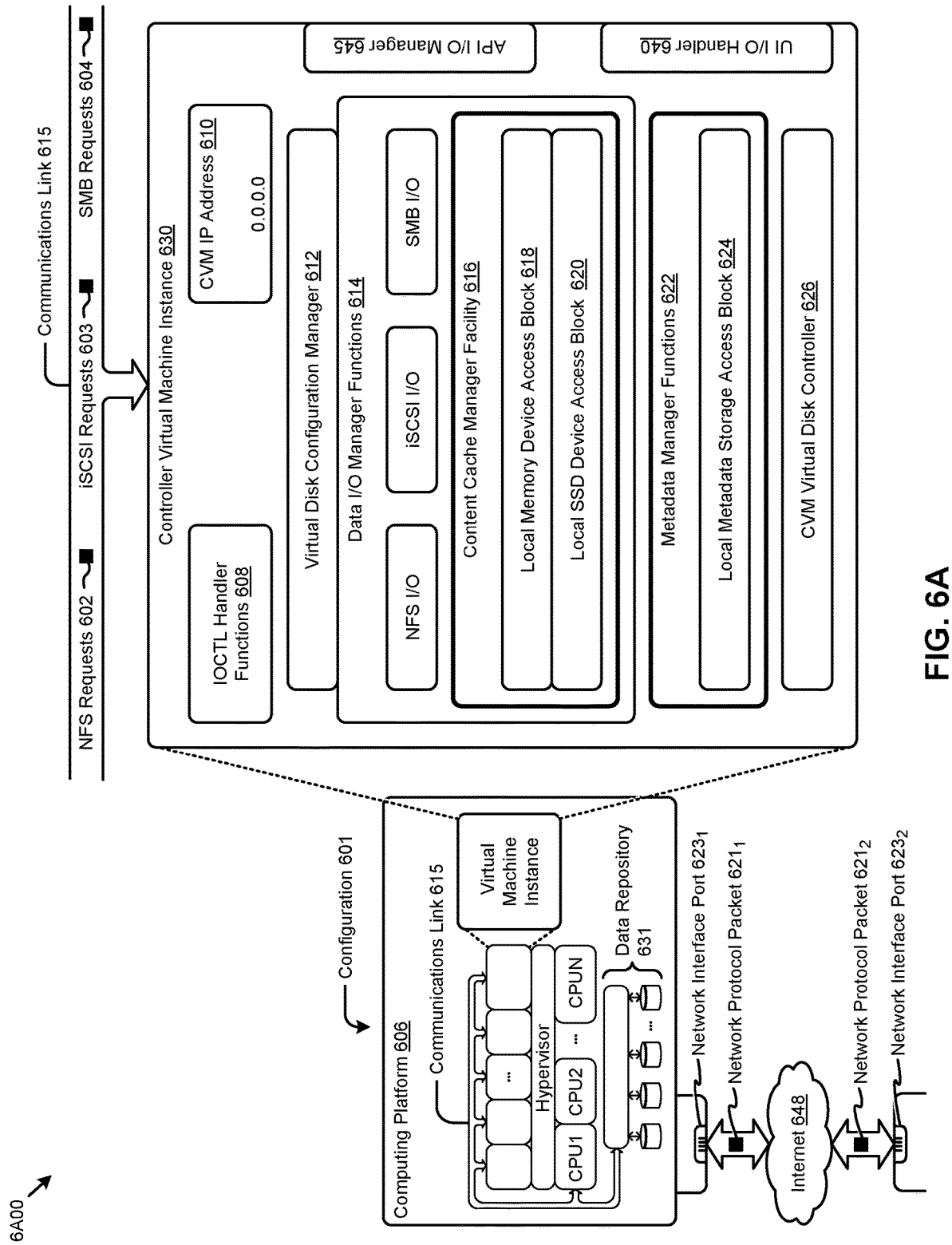
FIG. 6A and FIG. 6B depict virtualized controller architectures comprising collections of interconnected components suitable for implementing embodiments of the present disclosure and/or for use in the herein-described environments.

FIG. 6A depicts a virtualized controller as implemented by the shown virtual machine architecture 6A00. The heretofore-disclosed embodiments including variations of any virtualized controllers can be implemented in distributed systems where a plurality of networked-connected devices communicate and coordinate actions using inter-component messaging. Distributed systems are systems of interconnected components that are designed for or dedicated to storage operations as well as being for or dedicated to computing and/or networking operations. Interconnected components in a distributed system can operate cooperatively so as to serve a particular objective, such as to provide high-performance computing, high-performance networking capabilities, and/or high performance storage and/or high capacity storage capabilities. For example, a first set of components of a distributed computing system can coordinate to efficiently use a set of computational or compute resources, while a second set of components of the same distributed storage system can coordinate to efficiently use a set of data storage facilities. A hyperconverged system coordinates efficient use of compute and storage resources by and between the components of the distributed system. Adding a hyperconverged unit to a hyperconverged system expands the system in multiple dimensions. As an example, adding a hyperconverged unit to a hyperconverged system can expand in the dimension of storage capacity while concurrently expanding in the dimension of computing capacity and also in the dimension of networking bandwidth. Components of any of the foregoing distributed systems can comprise physically and/or logically distributed autonomous entities. Physical and/or logical collections of such autonomous entities can sometimes be referred to as nodes. In some hyperconverged systems, compute and storage resources can be integrated into a unit of a node. Multiple nodes can be interrelated into an array of nodes, which nodes can be grouped into physical groupings (e.g., arrays) and/or into logical groupings or topologies of nodes (e.g., spoke-and-wheel topologies, rings, etc.). Some hyperconverged systems implement certain aspects of virtualization. For example, in a hypervisor-assisted virtualization environment, certain of the autonomous entities of a distributed system can be implemented as virtual machines. As another example, in some virtualization environments, autonomous entities of a distributed system can be implemented as containers. In some systems and/or environments, hypervisor-assisted virtualization techniques and operating system virtualization techniques are combined.

As shown, the virtual machine architecture 6A00 comprises a collection of interconnected components suitable for implementing embodiments of the present disclosure and/or for use in the herein-described environments. Moreover, the shown virtual machine architecture 6A00 includes a virtual machine instance in a configuration 601 that is further described as pertaining to the controller virtual machine instance 630. A controller virtual machine instance receives block I/O (input/output or IO) storage requests as network file system (NFS) requests in the form of NFS requests 602, and/or internet small computer storage interface (iSCSI) block IO requests in the form of iSCSI requests 603, and/or Samba file system (SMB) requests in the form of SMB requests 604. The controller virtual machine (CVM) instance publishes and responds to an internet protocol (IP) address (e.g., CVM IP address 610). Various forms of input and output (I/O or IO) can be handled by one or more IO control handler functions (e.g., IOCTL functions 608) that interface to other functions such as data IO manager functions 614 and/or metadata manager functions 622. As shown, the data IO manager functions can include communication with a virtual disk configuration manager 612 and/or can include direct or indirect communication with any of various block IO functions (e.g., NFS IO, iSCSI IO, SMB IO, etc.).

In addition to block IO functions, the configuration 601 supports IO of any form (e.g., block IO, streaming IO, packet-based IO, HTTP traffic, etc.) through either or both of a user interface (UI) handler such as UI IO handler 640 and/or through any of a range of application programming interfaces (APIs), possibly through the shown API IO manager 645.

The communications link 615 can be configured to transmit (e.g., send, receive, signal, etc.) any types of communications packets comprising any organization of data items. The data items can comprise a payload data, a destination address (e.g., a destination IP address) and a source address (e.g., a source IP address), and can include various packet processing techniques (e.g., tunneling), encodings (e.g., encryption), and/or formatting of bit fields into fixed-length blocks or into variable length fields used to populate the payload. In some cases, packet characteristics include a version identifier, a packet or payload length, a traffic class, a flow label, etc. In some cases the payload comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to a data processor for execution. Such a medium may take many forms including, but not limited to, non-volatile media and volatile media. Non-volatile media includes any non-volatile storage medium, for example, solid state storage devices (SSDs) or optical or magnetic disks such as disk drives or tape drives. Volatile media includes dynamic memory such as a random access memory. As shown, the controller virtual machine instance 630 includes a content cache manager facility 616 that accesses storage locations, possibly including local dynamic random access memory (DRAM) (e.g., through the local memory device access block 618) and/or possibly including accesses to local solid state storage (e.g., through local SSD device access block 620).

Common forms of computer readable media includes any non-transitory computer readable medium, for example, floppy disk, flexible disk, hard disk, magnetic tape, or any other magnetic medium; CD-ROM or any other optical medium; punch cards, paper tape, or any other physical medium with patterns of holes; or any RAM, PROM, EPROM, FLASH-EPROM, or any other memory chip or cartridge. Any data can be stored, for example, in any form of external data repository 631, which in turn can be formatted into any one or more storage areas, and which can comprise parameterized storage accessible by a key (e.g., a filename, a table name, a block address, an offset address, etc.). An external data repository 631 can store any forms of data, and may comprise a storage area dedicated to storage of metadata pertaining to the stored forms of data. In some cases, metadata, can be divided into portions. Such portions and/or cache copies can be stored in the external storage data repository and/or in a local storage area (e.g., in local DRAM areas and/or in local SSD areas). Such local storage can be accessed using functions provided by a local metadata storage access block 624. The external data repository 631 can be configured using a CVM virtual disk controller 626, which can in turn manage any number or any configuration of virtual disks.

Execution of the sequences of instructions to practice certain embodiments of the disclosure are performed by a one or more instances of a software instruction processor, or a processing element such as a data processor, or such as a central processing unit (e.g., CPU1, CPU2). According to certain embodiments of the disclosure, two or more instances of a configuration 601 can be coupled by a communications link 615 (e.g., backplane, LAN, PSTN, wired or wireless network, etc.) and each instance may perform respective portions of sequences of instructions as may be required to practice embodiments of the disclosure.

The shown computing platform 606 is interconnected to the Internet 648 through one or more network interface ports (e.g., network interface port $623_1$ and network interface port $623_2$). The configuration 601 can be addressed through one or more network interface ports using an IP address. Any operational element within computing platform 606 can perform sending and receiving operations using any of a range of network protocols, possibly including network protocols that send and receive packets (e.g., network protocol packet $621_1$ and network protocol packet $621_2$).

The computing platform 606 may transmit and receive messages that can be composed of configuration data, and/or any other forms of data and/or instructions organized into a data structure (e.g., communications packets). In some cases, the data structure includes program code instructions (e.g., application code) communicated through Internet 648 and/or through any one or more instances of communications link 615. Received program code may be processed and/or executed by a CPU as it is received and/or program code may be stored in any volatile or non-volatile storage for later execution. Program code can be transmitted via an upload (e.g., an upload from an access device over the Internet 648 to computing platform 606). Further, program code and/or results of executing program code can be delivered to a particular user via a download (e.g., a download from the computing platform 606 over the Internet 648 to an access device).

The configuration 601 is merely one sample configuration. Other configurations or partitions can include further data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor. Some embodiments of a module include one or more special-purpose hardware components (e.g., power control, logic, sensors, transducers, etc.). Some embodiments of a module include instructions that are stored in a memory for execution so as to implement algorithms that facilitate operational and/or performance characteristics pertaining to managing asynchronous application interactions in distributed systems. In some embodiments, a module may include one or more state machines and/or combinational logic used to implement or facilitate the operational and/or performance characteristics pertaining to managing asynchronous application interactions in distributed systems.

Various implementations of the data repository comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of managing asynchronous application interactions in distributed systems). Such files or records can be brought into and/or stored in volatile or non-volatile memory.

Further details regarding general approaches to managing data repositories are described in U.S. Pat. No. 8,601,473 titled "ARCHITECTURE FOR MANAGING I/O AND STORAGE FOR A VIRTUALIZATION ENVIRONMENT", issued on Dec. 3, 2013 which is hereby incorporated by reference in its entirety.

Further details regarding general approaches to managing and maintaining data in data repositories are described in U.S. Pat. No. 8,549,518 titled "METHOD AND SYSTEM FOR IMPLEMENTING A MAINTENANCE SERVICE FOR MANAGING I/O AND STORAGE FOR A VIRTUALIZATION ENVIRONMENT", issued on Oct. 1, 2013, which is hereby incorporated by reference in its entirety.

Figure 6B:
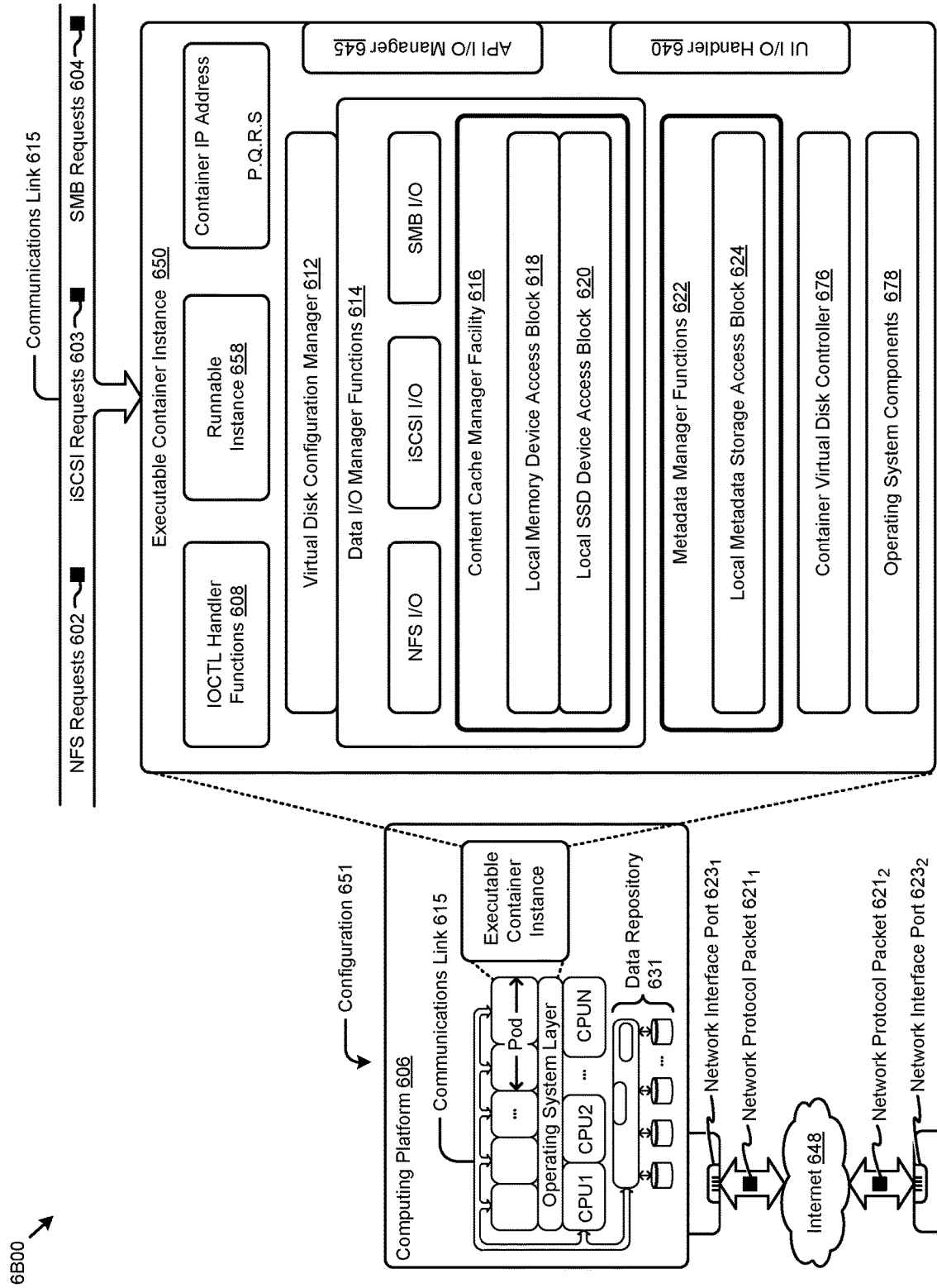

FIG. 6B depicts a virtualized controller implemented by a containerized architecture 6B00. The containerized architecture comprises a collection of interconnected components suitable for implementing embodiments of the present disclosure and/or for use in the herein-described environments. Moreover, the shown containerized architecture 6B00 includes a container instance in a configuration 651 that is further described as pertaining to the executable container instance 650. The configuration 651 includes an operating system layer (as shown) that performs addressing functions such as providing access to external requestors via an IP address (e.g., "P.Q.R.S", as shown). Providing access to external requestors can include implementing all or portions of a protocol specification (e.g., "http:") and possibly handling port-specific functions.

The operating system layer can perform port forwarding to any container (e.g., executable container instance 650). A container instance can be executed by a processor. Runnable portions of a container instance sometimes derive from a container image, which in turn might include all, or portions of any of, a Java archive repository (JAR) and/or its contents, and/or a script or scripts and/or a directory of scripts, and/or a virtual machine configuration, and may include any dependencies therefrom. In some cases a configuration within a container might include an image comprising a minimum set of runnable code. Contents of larger libraries and/or code or data that would not be accessed during runtime of the container instance can be omitted from the larger library to form a smaller library composed of only the code or data that would be accessed during runtime of the container instance. In some cases, start-up time for a container instance can be much faster than start-up time for a virtual machine instance, at least inasmuch as the container image might be much smaller than a respective virtual machine instance. Furthermore, start-up time for a container instance can be much faster than start-up time for a virtual machine instance, at least inasmuch as the container image might have many fewer code and/or data initialization steps to perform than a respective virtual machine instance.

A container instance (e.g., a Docker container) can serve as an instance of an application container. Any container of any sort can be rooted in a directory system, and can be configured to be accessed by file system commands (e.g., "ls" or "ls -a", etc.). The container might optionally include operating system components 678, however such a separate set of operating system components need not be provided. As an alternative, a container can include a runnable instance 658, which is built (e.g., through compilation and linking, or just-in-time compilation, etc.) to include all of the library and OS-like functions needed for execution of the runnable instance. In some cases, a runnable instance can be built with a virtual disk configuration manager, any of a variety of data IO management functions, etc. In some cases, a runnable instance includes code for, and access to, a container virtual disk controller 676. Such a container virtual disk controller can perform any of the functions that the aforementioned CVM virtual disk controller 626 can perform, yet such a container virtual disk controller does not rely on a hypervisor or any particular operating system so as to perform its range of functions.

In some environments multiple containers can be collocated and/or can share one or more contexts. For example, multiple containers that share access to a virtual disk can be assembled into a pod (e.g., a Kubernetes pod). Pods provide sharing mechanisms (e.g., when multiple containers are amalgamated into the scope of a pod) as well as isolation mechanisms (e.g., such that the namespace scope of one pod does not share the namespace scope of another pod).

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method for facilitating dynamic application discovery and inter-application communications for applications, the method comprising:

downloading, from a repository of applications, a second application to a host computer, said host computer hosting a first application, wherein the first application and the second application comprising applications that have been isolated from each other by assigning separate resources to the first application and the second application;

facilitating asynchronous discoverability between the first application and the second application based on at least a discoverability specification described in a first discoverability object, wherein the first discoverability object is provided for the first application and a second discoverability object is provided for the second application and the first application receives a notification of availability of the second application on a first message queue corresponding to the first application, and wherein the notification is based on a determination that the first discoverability object identifies the second application as discoverable for exchanging communications with the first application and the second discoverability object identifies the first application as discoverable for exchanging communications with the second application; and using a messaging data structure to facilitate communications between the second application and the first application by:

posting, to the first message queue, a message from the second application addressed to the first application; and receiving, by the first application, at least a portion of the message from the second application.

2. The method of claim 1, wherein the messaging data structure stores at least an application identifier corresponding to the first application.

3. The method of claim 1, wherein the first application comprises a first containerized application and the second application comprises a second containerized application different from the first containerized application.

4. The method of claim 1, wherein the second application is associated with a file on the repository of applications corresponding to registration for communication with the one or more other applications.

5. The method of claim 1, wherein the message comprises a first application identifier corresponding to the first application or a second application identifier corresponding to the second application.

6. The method of claim 1, wherein the first discoverability object or the second discoverability object comprises at least one of, a discoverability indicator, an application identifier, a vendor identifier, or a discovery type.

7. The method of claim 1, wherein the portion of the message comprises a payload from the second application for processing by the first application.

8. A non-transitory computer readable medium having stored thereon a sequence of instructions which, when executed by a processor performs a set of acts for facilitating dynamic application discovery and inter-application communications for applications, the set of acts comprising:

downloading, from a repository of applications, a second application to a host computer, said host computer hosting a first application, wherein the first application and the second application comprising applications that have been isolated from each other by assigning separate resources to the first application and the second application;

facilitating asynchronous discoverability between the first application and the second application based on at least a discoverability specification described in a first discoverability object, wherein the first discoverability object is provided for the first application and a second discoverability object is provided for the second application and the first application receives a notification of availability of the second application on a first message queue corresponding to the first application, and wherein the notification is based on a determination that the first discoverability object identifies the second application as discoverable for exchanging communications with the first application and the second discoverability object identifies the first application as discoverable for exchanging communications with the second application; and using a messaging data structure to facilitate communications between the second application and the first application by:

posting, to the first message queue, a message from the second application addressed to the first application; and receiving, by the first application, at least a portion of the message from the second application.

9. The computer readable medium of claim 8, wherein the first application comprises a first containerized application and the second application comprises a second containerized application different from the first containerized application.

10. The computer readable medium of claim 8, wherein the second application is associated with a file on the repository of applications corresponding to registration for communication with the one or more other applications.

11. The computer readable medium of claim 8, wherein the first discoverability object or the second discoverability object comprises at least one of, a discoverability indicator, an application identifier, a vendor identifier, or a discovery type.

12. The computer readable medium of claim 8, wherein the messaging data structure stores at least an application identifier corresponding to the first application.

13. The computer readable medium of claim 8, wherein the message comprises a first application identifier corresponding to the first application or a second application identifier corresponding to the second application.

14. The computer readable medium of claim 8, wherein the portion of the message comprises a payload from the second application for processing by the first application.

15. The computer readable medium of claim 8, wherein the set of acts further comprise presenting an aspect of the second application in a user interface based at least in part on a registered discoverability.

16. A system for facilitating dynamic application discovery and inter-application communications for applications, system comprising:
   a storage medium having stored thereon a sequence of instructions; and a processor that executes the sequence of instructions to perform a set of acts comprising:
      downloading, from a repository of applications, a second application to a host computer, said host computer hosting a first application, wherein the first application and the second application comprising applications that have been isolated from each other by assigning separate resources to the first application and the second application;
      facilitating asynchronous discoverability between the first application and the second application based on at least a discoverability specification described in a first discoverability object, wherein the first discoverability object is provided for the first application and a second discoverability object is provided for the second application and the first application receives a notification of availability of the second application on a first message queue corresponding to the first application, and wherein the notification is based on a determination that the first discoverability object identifies the second application as discoverable for exchanging communications with the first application and the second discoverability object identifies the first application as discoverable for exchanging communications with the second application; and
      using a messaging data structure to facilitate communications between the second application and the first application by:
         posting, to the first message queue, a message from the second application addressed to the first application; and
         receiving, by the first application, at least a portion of the message from the second application.

17. The system of claim 16, wherein the messaging data structure stores at least an application identifier corresponding to the first application.

18. The system of claim 16, wherein the message comprises a first application identifier corresponding to the first application or a second application identifier corresponding to the second application.

19. The system of claim 16, wherein the portion of the message comprises a payload from the second application for processing by the first application.

20. The system of claim 16, wherein the first application comprises a first containerized application and the second application comprises a second containerized application different from the first containerized application.

21. The system of claim 16, wherein the second application is associated with a file on the repository of applications corresponding to registration for communication with the one or more other applications.

22. The system of claim 16, wherein the first discoverability object or the second discoverability object comprises at least one of, a discoverability indicator, an application identifier, a vendor identifier, or a discovery type.

* * * * *